US012764722B2

(12) United States Patent
Lee et al.

(10) Patent No.: US 12,764,722 B2
(45) Date of Patent: Oct. 13, 2026

(54) METHOD AND DEVICE FOR TRANSMITTING SIGNAL THROUGH PLURALITY OF SLOTS IN WIRELESS COMMUNICATION SYSTEM

(71) Applicant: SAMSUNG ELECTRONICS CO., LTD., Suwon-si (KR)

(72) Inventors: Juyeong Lee, Suwon-si (KR); Heedon Gha, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 204 days.

(21) Appl. No.: 18/506,082

(22) Filed: Nov. 9, 2023

(65) Prior Publication Data

US 2024/0098714 A1 Mar. 21, 2024

Related U.S. Application Data

(63) Continuation of application No. PCT/KR2022/005725, filed on Apr. 21, 2022.

(30) Foreign Application Priority Data

May 10, 2021 (KR) ........................ 10-2021-0060322

(51) Int. Cl.
*H04W 72/0446* (2023.01)
*H04L 5/00* (2006.01)
*H04W 72/232* (2023.01)

(52) U.S. Cl.
CPC ..... *H04W 72/0446* (2013.01); *H04W 72/232* (2023.01)

(58) Field of Classification Search
None
See application file for complete search history.

(56) References Cited

U.S. PATENT DOCUMENTS 8,625,558 B2 1/2014 Lin
9,775,143 B2 9/2017 Imamura et al.
(Continued)

FOREIGN PATENT DOCUMENTS

CN 110839291 A 2/2020
CN 111385882 A 7/2020
(Continued)

OTHER PUBLICATIONS

International Search Report & Written Opinion for PCT/KR2022/005725 by Korean Intellectual Property Office dated Jul. 22, 2022.
(Continued)

*Primary Examiner* — Duc T Duong
(74) *Attorney, Agent, or Firm* — NIXON & VANDERHYE P.C.

(57) ABSTRACT

The present disclosure relates to a communication technique that merges IoT technology with a 5G communication system for supporting higher data transmission rates than 4G systems, and a system for same. The present disclosure may be applied to intelligent services (for example, smart homes, smart buildings, smart cities, smart cars or connected cars, healthcare, digital education, retail business, security and safety-related services, etc.) on the basis of 5G communication technology and IoT-related technology. In addition, the present disclosure relates to a method and device for transmitting a signal through a plurality of slots in a wireless communication system.

20 Claims, 15 Drawing Sheets

(56) References Cited

U.S. PATENT DOCUMENTS

| | | | | |
|---|---|---|---|---|
| 2018/0167932 | A1* | 6/2018 | Papasakellariou | H04L 1/1887 |
| 2019/0150164 | A1 | 5/2019 | Nam et al. | |
| 2019/0313383 | A1 | 10/2019 | Xiong et al. | |
| 2020/0235891 | A1 | 7/2020 | Lei et al. | |
| 2020/0314860 | A1 | 10/2020 | Zhou et al. | |
| 2021/0099348 | A1 | 4/2021 | Bhattad et al. | |
| 2021/0329649 | A1 | 10/2021 | Wu et al. | |
| 2022/0247531 | A1 | 8/2022 | Kim et al. | |
| 2022/0256511 | A1* | 8/2022 | Zewail | H04L 5/0094 |
| 2022/0303983 | A1* | 9/2022 | Ly | H04L 1/0009 |
| 2022/0321269 | A1* | 10/2022 | Nhan | H04L 1/0067 |
| 2022/0322336 | A1* | 10/2022 | Sridharan | H04L 5/0053 |
| 2022/0322356 | A1* | 10/2022 | Ly | H04L 5/001 |
| 2022/0330308 | A1* | 10/2022 | Ly | H04W 72/535 |
| 2023/0232380 | A1* | 7/2023 | Bhamri | H04L 1/08 370/329 |
| 2023/0284190 | A1* | 9/2023 | Bhamri | H04W 72/231 370/336 |
| 2023/0328723 | A1* | 10/2023 | Dai | H04L 1/08 370/329 |
| 2023/0354219 | A1* | 11/2023 | Yan | H04W 52/42 |
| 2023/0403683 | A1* | 12/2023 | He | H04L 1/08 |
| 2024/0008008 | A1* | 1/2024 | Nhan | H04L 5/0044 |
| 2024/0032024 | A1* | 1/2024 | Dai | H04L 1/08 |
| 2024/0163011 | A1* | 5/2024 | Hasegawa | H04L 1/0071 |
| 2024/0179688 | A1* | 5/2024 | Echigo | H04W 72/0446 |
| 2024/0179692 | A1* | 5/2024 | Xiong | H04W 72/0446 |
| 2024/0205892 | A1* | 6/2024 | Yamamoto | H04W 72/0446 |
| 2024/0380531 | A1* | 11/2024 | Qiao | H04W 72/044 |

FOREIGN PATENT DOCUMENTS

| | | | |
|---|---|---|---|
| JP | 5886639 | B2 | 2/2016 |
| KR | 10-2020-0088793 | A | 7/2020 |
| KR | 10-2021-0006145 | A | 1/2021 |
| WO | 2020/164102 | A1 | 8/2020 |
| WO | 2020/205600 | A1 | 10/2020 |
| WO | 2020/208216 | A1 | 10/2020 |
| WO | 2020/226391 | A1 | 11/2020 |

OTHER PUBLICATIONS

Iith et al. "On TB processing over multiple slots for PUSCH", 3GPP TSG RAN WG1 Meeting #104-bis-e, R1-2102913. Apr. 6, 2021.

VIVO. "Discussion on PUSCH TB processing over multiple slots", 3GPP TSG RAN WG1 Meeting #104b-e, R1-2102535. Apr. 6, 2021.

Qualcomm Incorporated. "TB Processing over multi-slot PUSCH", 3GPP TSG-RAN WG1 Meeting #104bis, R1-2103179. Apr. 7, 2021.

Moderaator. "FL summary of TB processing over multi-slot PUSCH (AI 8.8.1.2)", 3GPP TSG RAN WG1 #104-e R1-2102241. Jan. 25-Feb. 5, 2021.

3GPP TS 38.212 V16.5.0 (Mar. 2021). 3rd Generation Partnership Project; Technical Specification Group Radio Access Network; NR; Multiplexing and channel coding (Release 16). Mar. 30, 2021.

3GPP TS 38.213 V16.5.0 (Mar. 2021). 3rd Generation Partnership Project; Technical Specification Group Radio Access Network; NR; Physical layer procedures for control (Release 16). Mar. 30, 2021.

Extended European Search Report for EP 22807646.9 by European Patent Office Dated Oct. 8, 2024.

3GPP TSG RAN WG1 #104-e "Transport block processing for PUSCH coverage enhancements," R1-2101711. Jan. 2021.

China Telecom, R1-2102861, Discussion on TB processing over multi-slot PUSCH, 3GPP TSG RAN WG1 #104bis-E, dated Apr. 6, 2021.

WILUS Inc., R1-2103700, Discussion on TB processing over multi-slot PUSCH, 3GPP TSG RAN WG1 #104bis-E, dated Apr. 7, 2021.

Korean Office Action dated Jan. 14, 2026 for Korean Patent application 119981042713 with English Translation.

Notice of Allowance dated Jun. 24, 2026 from the Korean Intellectual Property Office (KIPO) in connection with counterpart Korean application 10-2021-0060322.

Sharp, R1-2103480, TB processing over multi-slot PUSCH, 3GPP TSG RAN WG1 #104b-e dated Apr. 7, 2021.

Samsung, R1-2103252, TB processing over multislot Pusch, 3GPP TSG RAN WG1 #104b-e dated Apr. 7, 2021.

NEC, R1-2103514, Discussion on TB processing over multi-slot PUSCH, 3GPP TSG RAN WG1 #104b-e, dated Apr. 7, 2021.

Moderator (Nokia, Nokia Shanghai Bell), R1-2104102, Final FL summary of TB processing over multi-slot PUSCH (AI 8.8.1.2), 3GPP TSG RAN WG1 #104-bis-e, dated Apr. 21, 2021.

* cited by examiner

METHOD AND DEVICE FOR TRANSMITTING SIGNAL THROUGH PLURALITY OF SLOTS IN WIRELESS COMMUNICATION SYSTEM

CROSS REFERENCE TO RELATED APPLICATIONS

This application is a continuation application of International Application No. PCT/KR2022/005725 filed on Apr. 21, 2022, which claims priority from and derives the benefit of Korean Patent Application No. 10-2021-0060322 filed on May 10, 2021, the entire contents of each of these applications is hereby incorporated in their entirety, by reference.

TECHNICAL FIELD

The present disclosure relates to a method and a device for transmitting signals through a plurality of slots in a wireless communication system.

BACKGROUND

To meet the demand for wireless data traffic having increased since deployment of 4G communication systems, efforts have been made to develop an improved 5G or pre-5G communication system. Therefore, the 5G or pre-5G communication system is also called a "beyond 4G Network" communication system or a "post LTE" system. The 5G communication system defined by 3GPP is called a "new radio (NR) system". The 5G communication system is considered to be implemented in ultrahigh frequency (mmWave) bands (e.g., 60 GHz bands) so as to accomplish higher data rates. To decrease propagation loss of the radio waves and increase the transmission distance in the ultrahigh frequency bands, beamforming, massive multiple-input multiple-output (massive MIMO), full dimensional Multiple-input and multiple-output (MIMO), full dimensional multiple-input and multiple-output (FD-MIMO), array antenna, analog beam forming, and large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving networks, cooperative communication, coordinated multi-points (CoMP), reception-end interference cancellation and the like. In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology (IT) services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (cloud RAN) as the above-described big data processing technology may also be considered an example of convergence of the 5G technology with the IoT technology.

With the recent development of 5G communication systems, the need for a method of repeatedly transmitting an uplink to expand cell coverage in an ultra-high frequency (mmWave) band has emerged.

DISCLOSURE

The disclosure proposes methods and devices for an effective signal processing method when the number of transport blocks and the number of slots or physical channels are not the same (hereinafter referred to as asymmetric transmission) in a communication system.

In various embodiments, methods and devices for transmitting a transport block through a plurality of slots or physical channels are proposed.

In various embodiments, a downlink control information (DCI) design for asymmetric transmission is proposed.

In various embodiments, a transport block size determination for asymmetric transmission is proposed.

In various embodiments, a code block segmentation design for asymmetric transmission is proposed.

In various embodiments, a code block cyclic redundancy check (CRC) design for asymmetric transmission is proposed.

In various embodiments, a transmission rate matching design for asymmetric transmission is proposed.

In various embodiments, an interleaving design for asymmetric transmission is proposed.

In various embodiments, a code block concatenation design for asymmetric transmission is proposed.

In various embodiments, a multiplexing design of data and control information is proposed.

In various embodiments, a scrambling design for asymmetric transmission is proposed.

In various embodiments, a method for combining some or all of the above tasks is proposed.

A method of a UE in a wireless communication system according to an embodiment of the disclosure for solving the above problems may include receiving transport block over multi-slot (TBoMS) configuration information including one transport block from a base station; receiving downlink control information for scheduling transmission of a physical uplink shared channel (PUSCH) from the base station; performing a physical layer signal processing procedure based on the TBoMS configuration information and downlink control information; and transmitting the PUSCH to the base station in a plurality of slots.

According to an embodiment, the downlink control information may include DCI format 0_0.

According to an embodiment, the TBoMS configuration information may include information on the number of slots for transmitting the one transport block, and the transport block size (TBS) related to the transport block may be determined based on the number of slots.

According to an embodiment, code block segmentation for the transport block may be performed in the physical layer signal processing procedure.

A method of a base station in a wireless communication system according to an embodiment of the disclosure may include transmitting transport block over multi-slot (TBoMS) configuration information including one transport block to a UE; transmitting downlink control information for scheduling transmission of a physical uplink shared channel (PUSCH) to the UE; and receiving the PUSCH transmitted based on a physical layer signal processing procedure performed based on the TBoMS configuration information and downlink control information from the UE in a plurality of slots.

A UE in a wireless communication system according to an embodiment of the disclosure may include a transceiver; and a controller configured to receive transport block over multi-slot (TBoMS) configuration information including one transport block from a base station, receive downlink control information for scheduling transmission of a physical uplink shared channel (PUSCH) from the base station, perform a physical layer signal processing procedure based on the TBoMS configuration information and downlink control information, and transmit the PUSCH to the base station in a plurality of slots.

A base station in a wireless communication system according to an embodiment of the disclosure may include a transceiver; and a controller configured to transmit transport block over multi-slot (TBoMS) configuration information including one transport block to a UE, transmit downlink control information for scheduling transmission of a physical uplink shared channel (PUSCH) to the UE, and receive the PUSCH transmitted based on a physical layer signal processing procedure performed based on the TBoMS configuration information and downlink control information from the UE in a plurality of slots.

The disclosure proposes a method and device for an effective signal processing method for asymmetric transmission.

Through the method of the disclosure, additional channel coding gain may be obtained, and coverage of an uplink channel may be improved.

Figure 1:
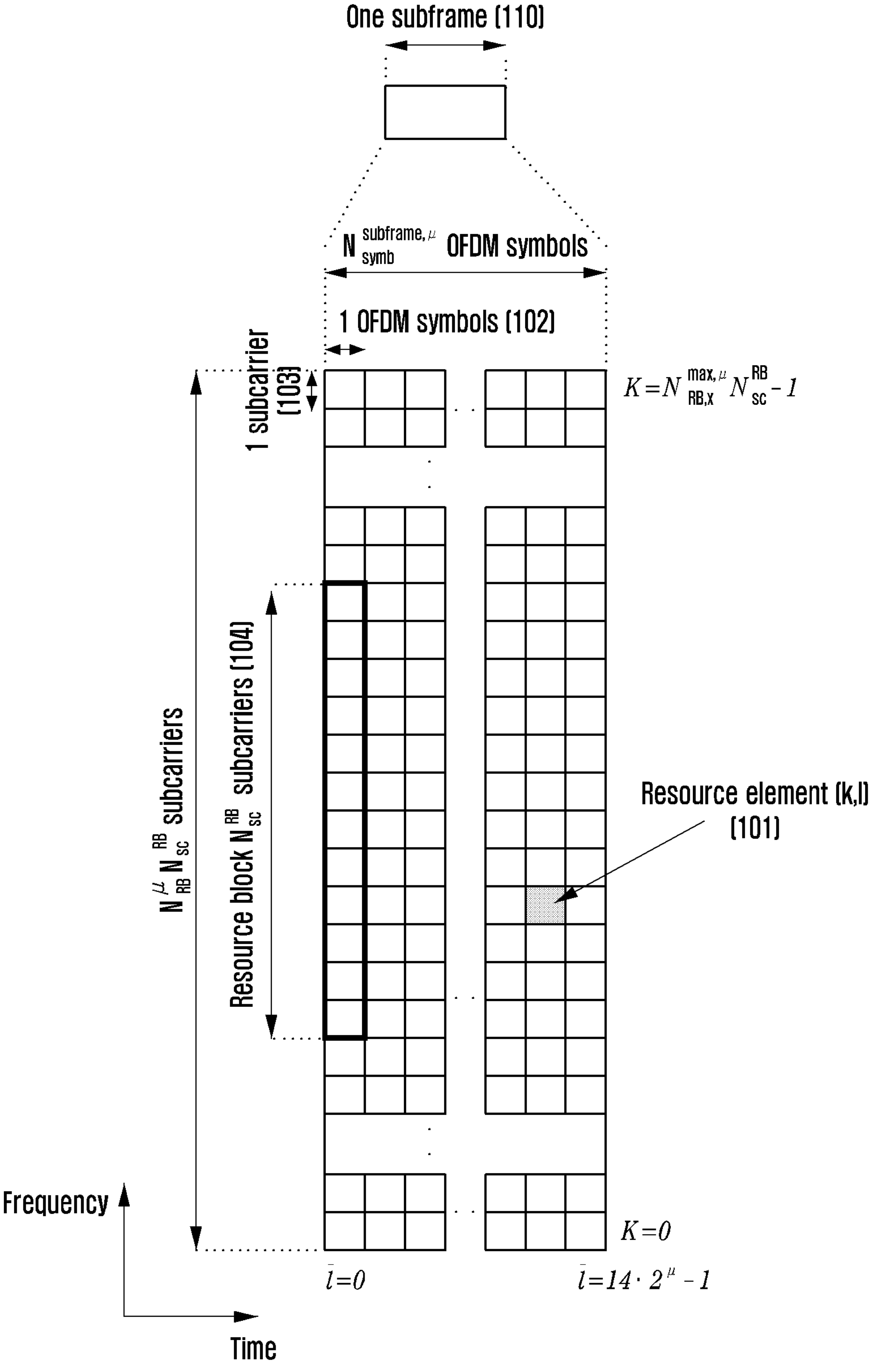
FIG. 1 is a diagram illustrating the basic structure of a time-frequency domain, which is a radio resource domain in which data or control channels are transmitted in a 5G system.

Hereinafter, embodiments of the disclosure will be described in detail with reference to the accompanying drawings.

The contents of the disclosure may be applied to near field communication systems including WiFi employing asymmetrical transmission and mobile communication systems including LTE, NR, and 6 systems. Furthermore, based on determinations by those skilled in the art, the disclosure may also be applied to other communication systems through some modifications without significantly departing from the scope of the disclosure. In describing embodiments of the disclosure below, descriptions related to technical contents well-known in the art and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements. Furthermore, in describing the disclosure, a detailed description of known functions or configurations incorporated herein will be omitted when it is determined that the description may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification.

In the following description, a base station is an entity that allocates resources to terminals, and may be at least one of a gNode B, an eNode B, a Node B, a base station (BS), a wireless access unit, a base station controller, and a node on a network. A terminal may include a user equipment (UE), a mobile station (MS), a cellular phone, a smartphone, a computer, or a multimedia system capable of performing communication functions. In the disclosure, a "downlink (DL)" refers to a radio link via which a base station transmits a signal to a terminal, an "uplink (UL)" refers to a radio link via which a terminal transmits a signal to a base station, and a "sidelink (SL)" refers to a radio transmission link between a terminal and a terminal. Furthermore, in the following description, an NR system may be described by way of example, but the embodiments of the disclosure may also be applied to other communication systems having similar technical backgrounds or channel types.

Herein, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Furthermore, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used in the embodiments of the disclosure, the term "unit" refers to a software element or a hardware element, such as a Field Programmable Gate Array (FPGA) or an Application Specific Integrated Circuit (ASIC), which performs a predetermined function. However, "unit" does not always have a meaning limited to software or hardware. A "unit" may be constructed either to be stored in an addressable storage medium or to execute one or more processors. Therefore, a "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" may be implemented to reproduce one or more CPUs within a device or a security multimedia card. Furthermore, a "unit" in the embodiments may include one or more processors.

It should be appreciated that an embodiment of the disclosure and the terms used therein are not intended to limit the technological features set forth herein to a particular embodiment and include various changes, equivalents, or replacements for an embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

Hereinafter, embodiments of the disclosure will be described in detail with accompanying drawings. Hereinafter, the method and device proposed in the embodiments of the disclosure will describe the embodiments of the disclosure as an example the PUSCH design, but may be applied to UL, DL, and SL channels of various systems applying asymmetric transmission, such as physical downlink shared channel (PDSCH) and physical sidelink shared channel (PSSCH). That is, the disclosure is not limited to each embodiment, and may be applied to a method for configuring frequency resources corresponding to other channels by using all or a combination of one or more embodiments proposed in the disclosure. Accordingly, the embodiments of the disclosure may be applied through some modifications within a range that does not significantly deviate from the scope of the disclosure by the judgment of a skilled person with technical knowledge.

Furthermore, in describing the disclosure, a detailed description of known functions or configurations incorporated herein will be omitted when it is determined that the description may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification.

A wireless communication system is advancing to a broadband wireless communication system for providing high-speed and high-quality packet data services using communication standards, such as high-speed packet access (HSPA) of 3GPP, LTE {long-term evolution or evolved universal terrestrial radio access (E-UTRA)}, LTE-Advanced (LTE-A), LTE-Pro, high-rate packet data (HRPD) of 3GPP2, ultra-mobile broadband (UMB), IEEE 802.17e, and the like, as well as typical voice-based services.

As a typical example of the broadband wireless communication system, an LTE system employs an orthogonal frequency division multiplexing (OFDM) scheme in a downlink (DL) and employs a single carrier frequency division multiple access (SC-FDMA) scheme in an uplink (UL). The uplink indicates a radio link through which a user equipment (UE) (or a mobile station (MS)) transmits data or control signals to a base station (BS) (eNode B), and the downlink indicates a radio link through which the base station transmits data or control signals to the UE. The above multiple access scheme separates data or control information of respective users by allocating and operating time-frequency resources for transmitting the data or control information for each user so as to avoid overlapping each other, that is, so as to establish orthogonality.

Since a 5G communication system, which is a post-LTE communication system, must freely reflect various requirements of users, service providers, and the like, services satisfying various requirements must be supported. The services considered in the 5G communication system include enhanced mobile broadband (eMBB) communication, massive machine-type communication (mMTC), ultra-reliability low-latency communication (URLLC), and the like.

eMBB aims at providing a data rate higher than that supported by existing LTE, LTE-A, or LTE-Pro. For example, in the 5G communication system, eMBB must provide a peak data rate of 20 Gbps in the downlink and a peak data rate of 10 Gbps in the uplink for a single base station. Furthermore, the 5G communication system must provide an increased user-perceived data rate to the UE, as well as the maximum data rate. In order to satisfy such requirements, transmission/reception technologies including a further enhanced multi-input multi-output (MIMO) transmission technique are required to be improved. In addition, the data rate required for the 5G communication system may be obtained using a frequency bandwidth more than 20 MHz in a frequency band of 3 to 6 GHz or 6 GHz or more, instead of transmitting signals using a transmission bandwidth up to 20 MHz in a band of 2 GHz used in LTE.

In addition, mMTC is being considered to support application services such as the Internet of Things (IoT) in the 5G communication system. mMTC has requirements, such as support of connection of a large number of UEs in a cell, enhancement coverage of UEs, improved battery time, a reduction in the cost of a UE, and the like, in order to effectively provide the Internet of Things. Since the Internet of Things provides communication functions while being provided to various sensors and various devices, it must support a large number of UEs (e.g., 1,000,000 UEs/km2) in a cell. In addition, the UEs supporting mMTC may require wider coverage than those of other services provided by the 5G communication system because the UEs are likely to be located in a shadow area, such as a basement of a building, which is not covered by the cell due to the nature of the service. The UE supporting mMTC should be configured to be inexpensive, and requires a very long battery life-time such as 10 to 15 years because it is difficult to frequently replace the battery of the UE.

Lastly, URLLC, which is a cellular-based mission-critical wireless communication service, may be used for remote control for, for example, robots or machines, industrial automation, unmanned aerial vehicles, remote health care, emergency alert, and the like. Thus, URLLC must provide communication with ultra-low latency and ultra-high reliability. For example, a service supporting URLLC must satisfy an air interface latency of less than 0.5 ms, and also requires a packet error rate of 10-5 or less. Therefore, for the services supporting URLLC, a 5G system must provide a transmit time interval (TTI) shorter than those of other services, and also must assign a large number of resources in a frequency band in order to secure reliability of a communication link.

The above-described three services in the 5G communication system (hereinafter, may be interchangeably used with "5G system"), that is, eMBB, URLLC, and mMTC, may be multiplexed and transmitted in a single system. In order to satisfy different requirements of the respective services, different transmission/reception techniques and transmission/reception parameters may be used between the services.

Hereinafter, the frame structure of the 5G system will be described in more detail with reference to the drawings.

FIG. 1 is a diagram illustrating the basic structure of a time-frequency domain, which is a radio resource domain of a 5G system.

In FIG. 1, the horizontal axis represents time domain and the vertical axis represents frequency domain. The basic unit of resources in the time and frequency domains is a resource element (RE) 101, which may be defined as one orthogonal frequency division multiplexing (OFDM) symbol (or discrete Fourier transform spread OFDM (DFT-s-OFDM) symbol) 102 on the time axis and one subcarrier 103 on the frequency axis.

$$N_{sc}^{RB}\text{(e.g., 12)}$$

consecutive REs in the frequency domain may configure one resource block (RB) 104. In addition, $$N_{symb}^{subframe}$$

consecutive OFDM symbols in the time domain may configure one subframe 110.

Figure 2:
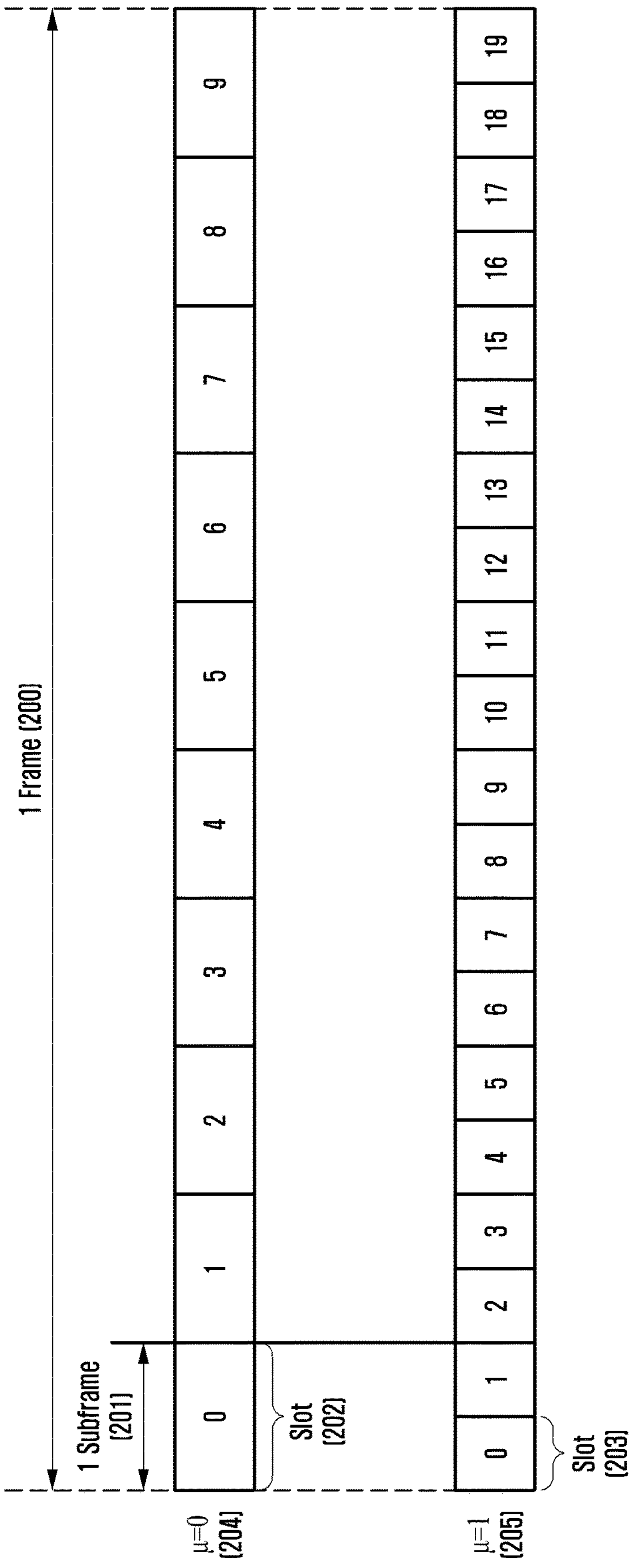
FIG. 2 is a diagram illustrating a slot structure considered in a 5G system.

FIG. 2 is a diagram illustrating a slot structure considered in a 5G system.

FIG. 2 illustrates an example of structures of a frame 200, a subframe 201, and a slot 202. One frame 200 may be defined as 10 ms. One subframe 201 may be defined as 1 ms, and thus one frame 200 may consist of a total of 10 subframes 201. In addition, one slot (202, 203) may be defined as 14 OFDM symbols (i.e., the number of symbols per one slot $$\left(N_{symb}^{slot}\right)$$

=14). One subframe 201 may consist of one or a plurality of slots 202 and 203, and the number of slots 202 and 203 per one subframe 201 may vary according to μ (204, 205) which is a configured value for the subcarrier spacing.

In an example of FIG. 2, the slot structure is illustrated when μ=0 (204) and μ=1 (205) as the subcarrier spacing configuration value. When μ=0 (204), one subframe 201 may consist of one slot 202, and when μ=1 (205), one subframe 201 may consist of two slots (203). That is, the number of slots $$(N_{slot}^{subframe,\mu})$$

per one subframe may vary according to the configuration value μ for the subcarrier spacing, and accordingly, the number of slots $$(N_{slot}^{frame,\mu})$$

per one frame may vary.

$$N_{slot}^{subframe,\mu}$$

and $$N_{slot}^{frame,\mu}$$

according to each subcarrier spacing configuration μ may be defined in Table 1 below.

TABLE 1

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 170 | 17 |
| 5 | 14 | 320 | 32 |

Next, a demodulation reference signal (DMRS), which is one of the reference signals in the 5G system, will be described in detail.

The DMRS may consist of a plurality of DMRS ports, and each port maintains orthogonality so as not to interfere with each other by using code division multiplexing (CDM) or frequency division multiplexing (FDM). However, the terms for the DMRS may be expressed in other terms depending on the user's intention and the purpose of using the reference signal. More specifically, the term DMRS is only presented as a specific example to easily explain the technical content of the disclosure and help understanding of the disclosure, and is not intended to limit the scope of the disclosure. That is, it is obvious to those of ordinary skill in the art that the technical idea of the disclosure may be implemented in reference signals as well.

Figure 3:
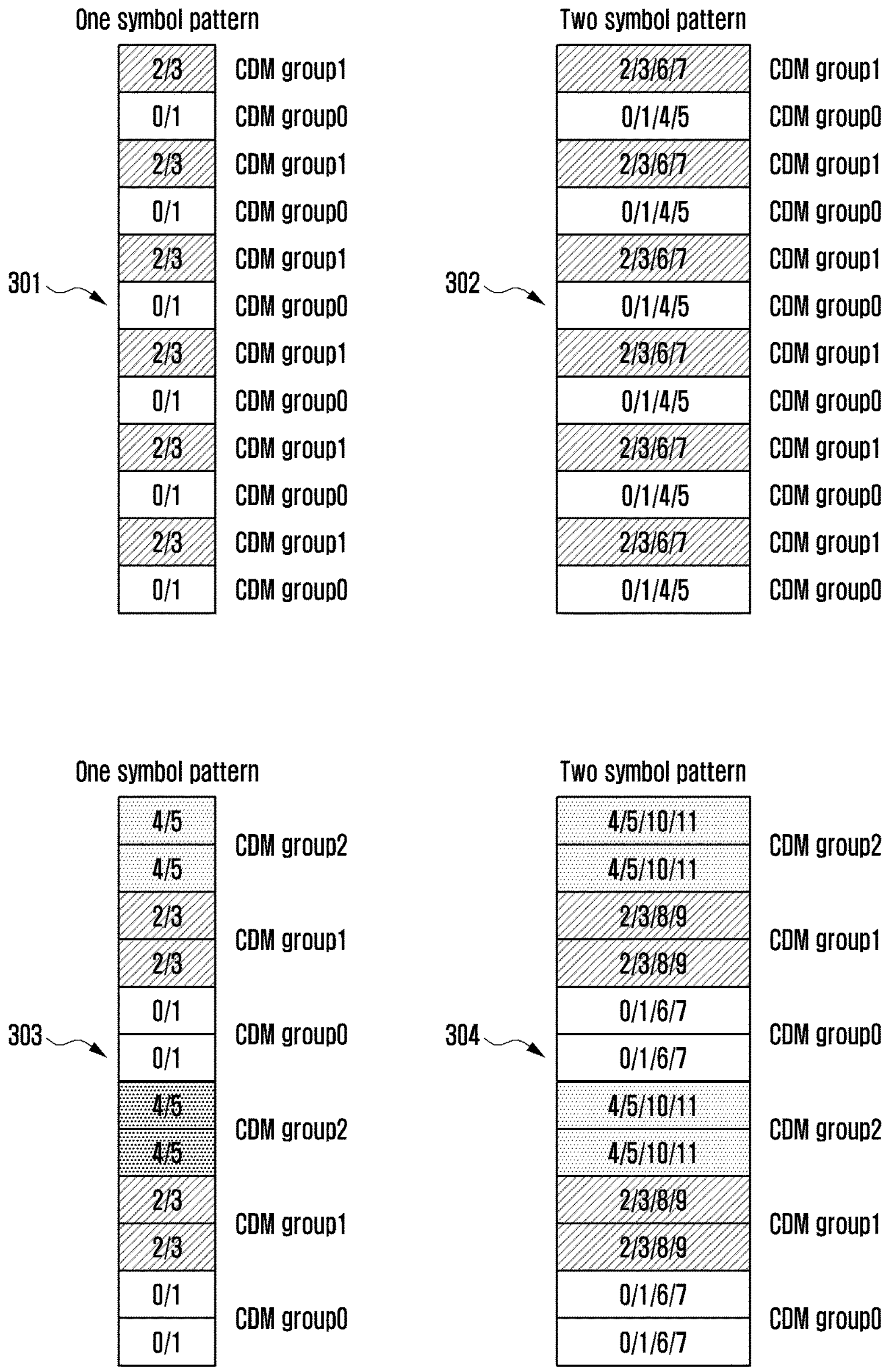
FIG. 3 is a diagram illustrating DMRS patterns (type1 and type2) used for communication between a base station and a UE in a 5G system.

FIG. 3 is a diagram illustrating DMRS patterns (type1 and type2) used for communication between a base station and a UE in a 5G system.

In a 5G system, two DMRS patterns may be supported. Two DMRS patterns are specifically illustrated in FIG. 3. Referring to FIG. 3, 301 and 302 represent DMRS type 1, where 301 represents a one-symbol pattern and 302 represents a two-symbol pattern. DMRS type 1 of 301 and 302 in FIG. 3 is a DMRS pattern with a comb 2 structure and may be composed of two CDM groups, and different CDM groups may be FDM.

In the one-symbol pattern of 301 of FIG. 3, two DMRS ports may be distinguished by applying CDM in frequency to the same CDM group, and accordingly, a total of four orthogonal DMRS ports may be configured. 301 of FIG. 3 illustrates the DMRS port ID mapped to each CDM group (in the case of downlink, the DMRS port ID is displayed by adding +1000 to the illustrated number). In the two-symbol pattern of 302 of FIG. 3, four DMRS ports may be distinguished by applying CDM in time/frequency to the same CDM group, and accordingly, a total of eight orthogonal DMRS ports may be configured. 302 of FIG. 3 illustrates the DMRS port ID mapped to each CDM group (in the case of downlink, the DMRS port ID is displayed by adding +1000 to the illustrated number).

DMRS type 2 of 303 and 304 in FIG. 3 is a DMRS pattern with a structure in which frequency domain orthogonal cover codes (FD-OCC) are applied to subcarriers adjacent in frequency and may be composed of three CDM groups, and different CDM groups may be FDM.

In the one-symbol pattern of 303 of FIG. 3, two DMRS ports may be distinguished by applying CDM in frequency to the same CDM group, and accordingly, a total of six orthogonal DMRS ports may be configured. 303 of FIG. 3 illustrates the DMRS port ID mapped to each CDM group (in the case of downlink, the DMRS port ID is displayed by adding +1000 to the illustrated number). In the two-symbol pattern of 304 of FIG. 3, four DMRS ports may be distinguished by applying CDM in time/frequency to the same CDM group, and accordingly, a total of twelve orthogonal DMRS ports may be configured. 304 of FIG. 3 illustrates the DMRS port ID mapped to each CDM group (in the case of downlink, the DMRS port ID is displayed by adding +1000 to the illustrated number).

As described above, in the NR system, two different DMRS patterns (301, 302 or 303, 304 of FIG. 3) may be configured, and whether the DMRS pattern is a one-symbol pattern (301, 303) or an adjacent two symbol pattern (302, 304) may also be configured. In addition, in the NR system, not only DMRS port numbers are scheduled, but also the number of CDM groups scheduled together for PDSCH rate matching may be configured and signaled. In addition, in the case of cyclic prefix based orthogonal frequency division multiplex (CP-OFDM), both DMRS patterns described above in DL and UL may be supported, and in the case of discrete Fourier transform spread OFDM (DFT-S-OFDM), only DMRS type1 among the DMRS patterns described above in UL may be supported. In addition, additional DMRS may be supported to be configurable. Front-loaded DMRS refers to the first DMRS appearing in the first symbol in time, and Additional DMRS refers to a DMRS appearing in a symbol after the front-loaded DMRS. In the NR system, the number of additional DMRSs may be configured from a minimum of 0 to a maximum of 3. In addition, when an additional DMRS is configured, the same pattern as the front-loaded DMRS may be assumed. More specifically, when information on whether the DMRS pattern type described above for the front-loaded DMRS is type1 or type2, information on whether the DMRS pattern is a one-symbol pattern or an adjacent two symbol pattern, and information on the number of CDM groups used with DMRS ports is indicated, if an additional DMRS is additionally configured, the additional DMRS may be assumed to be configured with the same DMRS information as the front-loaded DMRS.

More specifically, the downlink DMRS configuration described above may be configured through RRC signaling as illustrated in Table 2 below.

TABLE 2

```
DMRS-DownlinkConfig ::=                SEQUENCE {
  dmrs-Type              (DMRS          type          configuration)
ENUMERATED {type2}       OPTIONAL,   -- Need S
  dmrs-AdditionalPosition (additional DMRS OFDM symbol configura-
tion)
ENUMERATED {pos0, pos1, pos3}        OPTIONAL,   -- Need S
  maxLength (1 symbol or 2 symbol DMRS pattern-related configuration)
ENUMERATED {len2}          OPTIONAL,   -- Need S
    scramblingID0 (scrambling ID0)                        INTEGER
(0..65535)                OPTIONAL,   -- Need S
    scramblingID1   (scrambling ID1)                      INTEGER
(0..65535)             OPTIONAL,   -- Need S
    phaseTrackingRS (PTRS configuration)        SetupRelease { PTRS-
DownlinkConfig   } OPTIONAL,   -- Need M
  ...
}
```

In addition, the above-described uplink DMRS configuration may be configured through RRC signaling as illustrated in Table 3 below.

TABLE 3

```
DMRS-UplinkConfig ::=              SEQUENCE {
  dmrs-Type                  (DMRS    type                    configuration)
ENUMERATED                                                             {type2}
OPTIONAL,   -- Need S
  dmrs-AdditionalPosition   (additional   DMRS   OFDM   symbol   configuration)
ENUMERATED                  {pos0,            pos1,                      pos3}
OPTIONAL,   -- Need R
  phaseTrackingRS   (PTRS configuration)                        SetupRelease
{ PTRS-UplinkConfig }                                   OPTIONAL,   --
Need M
  maxLength  (1   symbol   or   2   symbol   DMRS   pattern-related   configuration)
ENUMERATED                                                               {len2}
OPTIONAL,   -- Need S
  transformPrecodingDisabled                           SEQUENCE {
    scramblingID0 (scrambling ID0)                              INTEGER
(0..65535)                OPTIONAL,   -- Need S
    scramblingID1   (scrambling ID0)                            INTEGER
(0..65535)                OPTIONAL,   -- Need S
    ...
  }
OPTIONAL,   -- Need R
  transformPrecodingEnabled                                SEQUENCE {
    nPUSCH-Identity              (cell    ID       for   DFT-s-OFDM)
INTEGER(0..1007)
OPTIONAL,   -- Need S
    sequenceGroupHopping           (sequence          Group          Hopping)
ENUMERATED {disabled}     OPTIONAL,   -- Need S
    sequenceHopping (sequence Hopping)                     ENUMERATED
{enabled}                  OPTIONAL,   -- Need S
    ...
  }
OPTIONAL,   -- Need R
  ...
}
```

Figure 4:
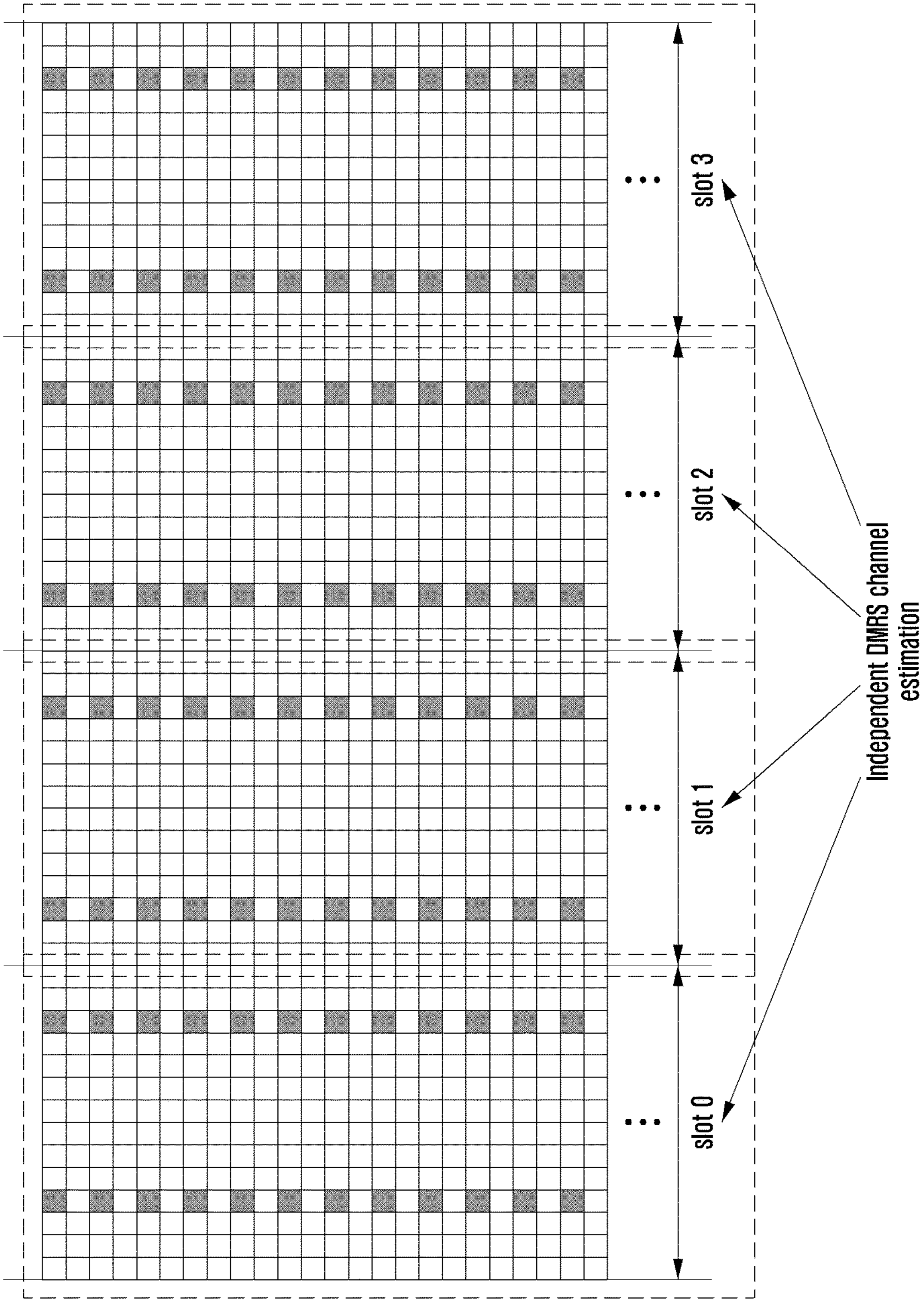
FIG. 4 is a diagram illustrating an example of channel estimation using a DMRS received from one PUSCH in a time band in a 5G system.

FIG. 4 is a diagram illustrating an example of channel estimation using a DMRS received from one PUSCH in a time band in a 5G system.

In performing a channel estimation for data decoding by using the above-described DMRS, the channel estimation may be performed within a corresponding bundling unit, precoding resource block group (PRG), by using PRB bundling linked to a system band in a frequency band. In addition, in a time unit, the channel estimation may be performed by assuming that only a DMRS received from one PUSCH has the same precoding.

Hereinafter, a method of time domain resource allocation for a data channel in a 5G communication system will be described. The base station may configure a table for time domain resource allocation information for a physical downlink shared channel (PDSCH) and a physical uplink shared channel (PUSCH) to the UE through higher signaling (e.g., RRC signaling).

The base station may configure a table including maxNrofDL-Allocations=17 entries for the PDSCH, and may configure a table including maxNrofUL-Allocations=17 entries for the PUSCH. The time domain resource allocation information may include, for example, PDCCH-to-PDSCH slot timing (corresponds to the time interval in units of slots between the time when the PDCCH is received and the time when the PDSCH scheduled by the received PDCCH is transmitted, denoted as K0) or PDCCH-to-PUSCH slot timing (corresponds to the time interval in units of slots between the time when the PDCCH is received and the time when the PUSCH scheduled by the received PDCCH is transmitted, denoted as K2), information on the location and length of a start symbol in which PDSCH or PUSCH is scheduled within a slot, PDSCH or PUSCH mapping type, and the like. For example, time domain resource allocation information for PDSCH may be configured to the UE through an RRC signal as illustrated in Table 4 below.

TABLE 4

| PDSCH-TimeDomainResourceAllocationList information element |
| --- |
| PDSCH-TimeDomainResourceAllocationList ::= SEQUENCE (SIZE(1..maxNrofDL-Allocations)) OF PDSCH-TimeDomain- |

TABLE 4-continued

PDSCH-TimeDomainResourceAllocationList information element

```
ResourceAllocation
PDSCH-TimeDomainResourceAllocation ::=   SEQUENCE {
  k0                               INTEGER(0..32)
OPTIONAL,   -- Need S
  (PDCCH-to-PDSCH timing, slot unit)
mappingType                      ENUMERATED {typeA, typeB},
  (PDSCH mapping type)
startSymbolAndLength             INTEGER (0..127)
(start symbol of PDSCH and length)
}
```

In addition, for example, time domain resource allocation information for PUSCH may be configured to the UE through an RRC signal as illustrated in Table 5 below.

TABLE 5

PUSCH-TimeDomainResourceAllocation information element

```
PUSCH-TimeDomainResourceAllocationList ::=   SEQUENCE
(SIZE(1..maxNrofUL-Allocations)) OF PUSCH-TimeDomain-
ResourceAllocation
PUSCH-TimeDomainResourceAllocation ::=   SEQUENCE {
  k2                               INTEGER(0..32)
OPTIONAL,   -- Need S
  (PDCCH-to-PUSCH timing, slot unit)
  mappingType                      ENUMERATED {typeA, typeB},
  (PUSCH mapping type)
  startSymbolAndLength             INTEGER (0..127)
  (start symbol of PUSCH and length)
}
```

The base station may transmit one of the table entries for the time domain resource allocation information to the UE through L1 signaling (e.g., downlink control information (DCI)) (for example, it may be indicated by the 'time domain resource allocation' field in DCI). The UE may obtain time domain resource allocation information for the PDSCH or PUSCH based on the DCI received from the base station.

In the following, transmission of an uplink data channel (physical uplink shared channel (PUSCH)) in a 5G system will be described in detail. The PUSCH transmission may be dynamically scheduled by a UL grant in DCI or may be operated by configured grant Type 1 or Type 2. The dynamic scheduling for PUSCH transmission, for example, may be indicated by DCI format 0_0 or 0_1.

The grant Type 1 PUSCH transmission may be configured semi-statically through reception of configuredGrantConfig including the rrc-ConfiguredUplinkGrant of Table 6 through higher signaling without receiving UL grant in DCI. The configured grant Type 2 PUSCH transmission may be scheduled semi-continuously by UL grant in DCI after reception of configuredGrantConfig that does not include the rrc-ConfiguredUplinkGrant of Table 6 through higher signaling. When the PUSCH transmission is operated by a configured grant, parameters applied to the PUSCH transmission may be applied through configuredGrantConfig that is the higher signaling of Table 6 except for specific parameters (e.g., dataScramblingIdentityPUSCH, txConfig, codebookSubset, maxRank, scaling of UCI-OnPUSCH, and the like) provided by pusch-Config, which is the higher signaling, of [Table 7]. For example, if the UE is provided with the transformPrecoder in configuredGrantConfig, which is the higher signaling of Table 6, the UE may apply tp-pi2BPSK in pusch-Config of Table 7 to PUSCH transmission operated by the configured grant.

TABLE 6

ConfiguredGrantConfig

```
ConfiguredGrantConfig ::=        SEQUENCE {
  frequencyHopping                         ENUMERATED {intraSlot, interSlot}
OPTIONAL,   -- Need S,
  cg-DMRS-Configuration              DMRS-UplinkConfig,
  mcs-Table                              ENUMERATED {qam256, qam64LowSE}
OPTIONAL,   -- Need S
  mcs-TableTransformPrecoder           ENUMERATED {qam256, qam64LowSE}
OPTIONAL,   -- Need S
  uci-OnPUSCH                              SetupRelease { CG-UCI-OnPUSCH }
OPTIONAL,   -- Need M
  resourceAllocation                 ENUMERATED { resourceAllocationType0,
resourceAllocationType1, dynamicSwitch },
  rbg-Size                                     ENUMERATED {config2}
OPTIONAL,   -- Need S
  powerControlLoopToUse              ENUMERATED {n0, n1},
  p0-PUSCH-Alpha                      P0-PUSCH-AlphaSetId,
  transformPrecoder                        ENUMERATED {enabled, disabled}
OPTIONAL,   -- Need S
  nrofHARQ-Processes                 INTEGER(1..17),
  repK                                ENUMERATED {n1, n2, n4, n8},
  repK-RV                                 ENUMERATED {s1-0231, s2-0303, s3-
0000}                                OPTIONAL,   -- Need R
  periodicity                      ENUMERATED {
                                             sym2, sym7, sym1x14, sym2x14,
sym4x14, sym5x14, sym8x14, sym10x14, sym17x14, sym20x14,
                                             sym32x14, sym40x14, sym64x14,
sym80x14, sym128x14, sym170x14, sym256x14, sym320x14, sym512x14,
                                             sym640x14,      sym1024x14,
sym1280x14, sym2560x14, sym5120x14,
                                             sym6,   sym1x12,   sym2x12,
sym4x12, sym5x12, sym8x12, sym10x12, sym17x12, sym20x12, sym32x12,
                                             sym40x12, sym64x12, sym80x12,
sym128x12, sym170x12, sym256x12, sym320x12, sym512x12, sym640x12,
                                             sym1280x12, sym2560x12
  },
```

TABLE 6-continued

ConfiguredGrantConfig

```
  configuredGrantTimer                          INTEGER (1..64)
OPTIONAL,   -- Need R
  rrc-ConfiguredUplinkGrant                SEQUENCE {
    timeDomainOffset                            INTEGER (0..5119),
    timeDomainAllocation                        INTEGER (0..16),
    frequencyDomainAllocation                 BIT STRING (SIZE(18)),
    antennaPort                                 INTEGER (0..31),
    dmrs-SeqInitialization                          INTEGER (0..1)
OPTIONAL,   -- Need R
    precodingAndNumberOfLayers                 INTEGER (0..63),
    srs-ResourceIndicator                          INTEGER (0..16)
OPTIONAL,   -- Need R
    mcsAndTBS                                      INTEGER (0..31),
    frequencyHoppingOffset                            INTEGER (1..
maxNrofPhysicalResourceBlocks-1)               OPTIONAL,   -- Need R
    pathlossReferenceIndex                          INTEGER (0..maxNrofPUSCH-
PathlossReferenceRSs-1),
    ...
  }
OPTIONAL,   -- Need R
  ...
}
```

Next, a PUSCH transmission method will be described. The DMRS antenna port for PUSCH transmission may be the same as the antenna port for SRS transmission. The PUSCH transmission may follow a codebook-based transmission method and a non-codebook-based transmission method, respectively, depending on whether the value of txConfig in pusch-Config of Table 7, which is higher signaling, is 'codebook' or 'nonCodebook'. As described above, the PUSCH transmission may be dynamically scheduled through DCI format 0_0 or 0_1 and may be semi-statically configured by the configured grant.

If the UE has received an instruction of scheduling for the PUSCH transmission through DCI format 0_0, the UE may perform beam configuration for PUSCH transmission by using a pucch-spatialRelationInfoID corresponding to the UE-specific (dedicated) PUCCH resource having the lowest ID within the uplink bandwidth part (BWP) activated in the serving cell. In this case, the PUSCH transmission may be performed based on a single antenna port. The UE may not expect scheduling for PUSCH transmission through DCI format 0_0 within the BWP in which the PUCCH resource including the pucch-spatialRelationInfo is not configured. If the UE has not received configured txConfig in pusch-Config of Table 7, the UE may not expect to be scheduled with DCI format 0_1.

TABLE 7

PUSCH-Config

```
PUSCH-Config ::=                                  SEQUENCE {
  dataScramblingIdentityPUSCH                              INTEGER (0..1023)
OPTIONAL,   -- Need S
  txConfig                                                  ENUMERATED {codebook,
nonCodebook}               OPTIONAL,   -- Need S
  dmrs-UplinkForPUSCH-MappingTypeA              SetupRelease { DMRS-UplinkConfig }
OPTIONAL,   -- Need M
  dmrs-UplinkForPUSCH-MappingTypeB              SetupRelease { DMRS-UplinkConfig }
OPTIONAL,   -- Need M
  pusch-PowerControl                                        PUSCH-PowerControl
OPTIONAL,   -- Need M
  frequencyHopping                                ENUMERATED {intraSlot, interSlot}
OPTIONAL,   -- Need S
  frequencyHoppingOffsetLists     SEQUENCE (SIZE (1..4)) OF INTEGER (1..
maxNrofPhysicalResourceBlocks-1)
OPTIONAL,   -- Need M
  resource Allocation                      ENUMERATED { resourceAllocationType0,
resource AllocationType1, dynamicSwitch},
  pusch-TimeDomainAllocationList                         SetupRelease { PUSCH-
TimeDomainResourceAllocationList }        OPTIONAL,   -- Need M
  pusch-AggregationFactor       ENUMERATED { n2, n4, n8 }              OPTIONAL,
-- Need S
  mcs-Table                                ENUMERATED   {qam256,    qam64LowSE}
OPTIONAL,   -- Need S
  mcs-TableTransformPrecoder      ENUMERATED   {qam256,              qam64LowSE}
OPTIONAL,   -- Need S
  transformPrecoder                     ENUMERATED   {enabled,   disabled}
OPTIONAL,   -- Need S
  codebookSubset                 ENUMERATED   {fullyAndPartialAndNonCoherent,
partialAndNonCoherent,nonCoherent}
                           OPTIONAL, -- Cond codebookBased
```

TABLE 7-continued

| PUSCH-Config | |
|---|---|
| maxRank codebookBased | INTEGER (1..4) OPTIONAL, -- Cond |
| rbg-Size OPTIONAL, -- Need S | ENUMERATED { config2} |
| uci-OnPUSCH OPTIONAL, -- Need M | SetupRelease { UCI-OnPUSCH} |
| tp-pi2BPSK OPTIONAL, -- Need S | ENUMERATED {enabled} |
| ... | |
| } | |

Next, codebook-based PUSCH transmission will be described. The codebook-based PUSCH transmission may be dynamically scheduled through DCI format 0_0 or 0_1, and may operate semi-statically by a configured grant. When the codebook-based PUSCH is dynamically scheduled by DCI format 0_1 or is configured semi-statically by the configured grant, the UE may determine a precoder for PUSCH transmission based on SRS resource indicator (SRI), the transmission precoding matrix indicator (TPMI), and the transmission rank (the number of PUSCH transmission layers).

In this case, the SRI may be given through a field SRS resource indicator in the DCI or may be configured through srs-ResourceIndicator which is higher signaling. When transmitting the codebook-based PUSCH, the UE may receive at least one configured SRS resource and, as an example, up to two configured SRS resources. When the UE is provided with an SRI through DCI, the SRS resource indicated by the corresponding SRI may refer to an SRS resource corresponding to the SRI among SRS resources transmitted before the PDCCH including the corresponding SRI. In addition, TPMI and transmission rank may be given through field precoding information and number of layers in DCI, or may be configured through precodingAndNumberOfLayers, which is a higher signaling. TPMI may be used to indicate the precoder applied to PUSCH transmission.

The precoder to be used for PUSCH transmission may be selected from an uplink codebook having the same number of antenna ports as the nrofSRS-Ports value in SRS-Config, which is a higher signaling. In codebook-based PUSCH transmission, the UE may determine the codebook subset based on the TPMI and the codebookSubset within the push-Config, which is the higher signaling. In this case, the codebookSubset in push-Config, which is the higher signaling, may be configured to one of 'fullyAndPartialAndNonCoherent', 'partialAndNonCoherent', or 'nonCoherent' based on UE capability reported by the UE to the base station.

If the UE reports 'partialAndNonCoherent' with UE capability, the UE may not expect the value of the higher signaling codebookSubset to be configured to 'fullyAndPartialAndNonCoherent'. In addition, if the UE reports 'nonCoherent' with UE capability, the UE may not expect the value of the higher signaling codebookSubset to be configured to 'fullyAndPartialAndNonCoherent' or 'partialAndNonCoherent'. When nrofSRS-Ports in SRS-ResourceSet, which is the higher signaling, indicates two SRS antenna ports, the UE may not expect the value of codebookSubset, which is the higher signaling, to be configured to 'partialAndNonCoherent'.

The UE may receive one SRS resource set configured in which the value of the usage in the SRS-resource set, which is the higher signaling, is configured to 'codebook', and one SRS resource within the SRS resource set may be indicated through the SRI. If multiple SRS resources are configured within the SRS resource set in which the usage value in the SRS-resource set, which is the higher signaling, is configured to 'codebook', the UE may expect that the value of nrofSRS-Ports in the SRS-resource, which is the higher signaling, is configured to be the same for all SRS resources.

The UE may transmit one or a plurality of SRS resources included in the SRS resource set in which the value of usage is configured to 'codebook' to the base station according to upper level signaling, and the base station may select one of the SRS resources transmitted by the UE and instruct the UE to perform PUSCH transmission by using the transmission beam information of the corresponding SRS resource. In this case, in the codebook-based PUSCH transmission, the SRI is used as information on selecting an index of one SRS resource and may be included in the DCI. In addition, the base station may include information indicating the TPMI and rank to be used by the UE for PUSCH transmission in the DCI for transmission. The UE may perform PUSCH transmission by applying the TPMI indicated based on the transmission beam of the corresponding SRS resource and the precoder indicated by the rank by using the SRS resource indicated by the SRI.

Next, non-codebook-based PUSCH transmission will be described. The non-codebook-based PUSCH transmission may be dynamically scheduled through DCI format 0_0 or 0_1, or may operate semi-statically by a configured grant. When at least one SRS resource is configured in the SRS resource set in which the value of usage in the SRS-ResourceSet, which is the higher signaling, is configured to 'nonCodebook', the UE may receive the non-codebook-based PUSCH transmission scheduled through DCI format 0_1.

For the SRS resource set in which the value of usage in the SRS-ResourceSet, which is the higher signaling, is configured to 'nonCodebook', the UE may receive a configured non-zero power (NZP) CSI-RS resource related to one SRS resource set. The UE may perform calculation on the precoder for SRS transmission through measurement of the configured NZP CSI-RS resource related to the SRS resource set. If the difference between the last received symbol of the aperiodic NZP CSI-RS resource related to the SRS resource set and the first symbol of the aperiodic SRS transmission in the UE is less than specific symbols (e.g., 42 symbols), the UE may not expect information on the precoder for SRS transmission to be updated.

When the value of resourceType in the SRS-ResourceSet, which is the higher signaling, is configured to 'aperiodic', the NZP CSI-RS related to the SRS-ResourceSet may be indicated by the SRS request, which is a field in DCI format 0_1 or 1_1. In this case, when the NZP CSI-RS related to the SRS-ResourceSet is an aperiodic NZP CSI-RS resource, and when the value of the field SRS request in DCI format 0_1 or 1_1 is not '00', it may indicate that the NZP CSI-RS related to the SRS-ResourceSet exists. In this case, the corresponding DCI should not indicate cross carrier or cross BWP scheduling. In addition, when the value of the SRS request indicates the presence of the NZP CSI-RS, the corresponding NZP CSI-RS may be located in the slot in which the PDCCH including the SRS request field is transmitted. In this case, the TCI states configured in the scheduled subcarrier may not be configured to QCL-TypeD.

If a periodic or semi-persistent SRS resource set is configured, the NZP CSI-RS related to the SRS resource set may be indicated through the associatedCSI-RS in the SRS-ResourceSet, which is the higher signaling. For non-codebook-based transmission, the UE may not expect that spatialRelationInfo, which is the higher signaling for SRS resource, and associatedCSI-RS in SRS-ResourceSet, which is the higher signaling, are configured together.

When a plurality of SRS resources are configured, the UE may determine the precoder to be applied to PUSCH transmission and the transmission rank based on the SRI indicated by the base station. In this case, the SRI may be indicated through a field SRS resource indicator in the DCI or may be configured through srs-ResourceIndicator, which is the higher signaling. Like the above-described codebook-based PUSCH transmission, when the UE receives SRI through DCI, the SRS resource indicated by the corresponding SRI may refer to the SRS resource corresponding to the SRI among the SRS resources transmitted before the PDCCH including the corresponding SRI. The UE may use one or a plurality of SRS resources for SRS transmission, and the maximum number of SRS resources capable of simultaneous transmission in the same symbol in one SRS resource set may be determined by the UE capability reported by the UE to the base station. In this case, the SRS resources simultaneously transmitted by the UE may occupy the same RB. The UE may configure one SRS port for each SRS resource. Only one SRS resource set in which the value of usage in the SRS-ResourceSet, which is the higher signaling, may be configured to 'nonCodebook', and up to four SRS resources for non-codebook-based PUSCH transmission may be configured.

The base station may transmit one NZP-CSI-RS related to the SRS resource set to the UE, and the UE may calculate a precoder to be used when transmitting one or a plurality of SRS resources in the corresponding SRS resource set based on the result measured when receiving the corresponding NZP-CSI-RS. The UE may apply the calculated precoder when transmitting one or a plurality of SRS resources in the SRS resource set in which usage is configured to 'nonCodebook' to the base station, and the base station may select one or a plurality of SRS resources among received one or a plurality of SRS resources. In this case, in non-codebook-based PUSCH transmission, the SRI indicates an index capable of representing one or a combination of a plurality of SRS resources, and the SRI may be included in the DCI. In this case, the number of SRS resources indicated by the SRI transmitted by the base station may be the number of transmission layers of the PUSCH, and the UE may transmit the PUSCH by applying the precoder applied to the SRS resource transmission to each layer.

Next, repeated PUSCH transmissions will be described. When the UE has received scheduling for PUSCH transmission with DCI format 0_1 in the PDCCH including the CRC scrambled with cell radio-network temporary identifier (C-RNTI), modulation coding scheme (MCS)-C-RNTI or configured scheduling radio-network temporary identifier (CS-RNTI), if the UE is configured with higher layer signaling push-AggregationFactor, the same symbol allocation is applied in consecutive slots equal to the push-AggregationFactor, and PUSCH transmission may be limited to single-rank transmission. For example, the UE must repeat the same transport block (TB) in consecutive slots equal to the pushch-AggregationFactor and apply the same symbol allocation for each slot. Table 8 illustrates a redundancy version applied to repeated PUSCH transmissions for each slot. If the UE has received scheduling for repeated PUSCH transmission in a plurality of slots with DCI format 0_1, and at least one symbol among slots in which repeated PUSCH transmissions are performed is indicated as a downlink symbol according to information of higher layer signaling tdd-UL-DL-ConfigurationCommon or tdd-UL-DL-ConfigurationDedicated, the UE may not perform PUSCH transmission in the slot where the corresponding symbol is located.

TABLE 8

| $rv_{id}$ indicated by the DCI scheduling | $rv_{id}$ to be applied to $n^{th}$ transmission occasion | | | |
|---|---|---|---|---|
| the PUSCH | n mod 4 = 0 | n mod 4 = 1 | n mod 4 = 2 | n mod 4 = 3 |
| 0 | 0 | 2 | 3 | 1 |
| 2 | 2 | 3 | 1 | 0 |
| 3 | 3 | 1 | 0 | 2 |
| 1 | 1 | 0 | 2 | 3 |

Hereinafter, repetitive transmission of an uplink data channel (PUSCH) in a 5G system will be described in detail. The 5G system supports two types, PUSCH repeated transmission type A and PUSCH repeated transmission type B, as repeated transmission methods of an uplink data channel. The UE may be configured with either PUSCH repetitive transmission type A or B through higher layer signaling.

Regarding PUSCH repetitive transmission type A:

As described above, the start symbol and length of the uplink data channel are determined by the time domain resource allocation method within one slot, and the base station may transmit the number of repeated transmissions to the UE through higher layer signaling (e.g., RRC signaling) or L1 signaling (e.g., DCI).

The UE may repeatedly transmit an uplink data channel having the same start symbol and length as the uplink data channel configured above in consecutive slots based on the number of repeated transmissions received from the base station. In this case, when at least one symbol among the symbols in the slot configured by the base station to the UE as downlink or in the slot for repeated transmission of the uplink data channel configured by the UE is configured to downlink, the UE may omit uplink data channel transmission in the corresponding slot. This may be included in the number of repeated transmissions of the uplink data channel, but may not be transmitted.

Regarding PUSCH repetitive transmission type B:

As described above, the start symbol and length of the uplink data channel are determined by the time domain resource allocation method within one slot, and the base station may transmit the number of repeated transmissions numberofrepetitions to the UE through higher layer signaling (e.g., RRC signaling) or L1 signaling (e.g., DCI).

First, the nominal repetition of the uplink data channel may be determined as follows based on the start symbol and length of the uplink data channel configured above. Here, nominal repetition may refer to a resource of a symbol configured by the base station for repeated PUSCH transmission, and the UE may determine resources available for uplink in the configured nominal repetition. In this case, the slot where the $n^{th}$ nominal repetition starts may be given by $$K_s + \left\lfloor \frac{S + n \cdot L}{N_{symb}^{slot}} \right\rfloor$$

and the symbol where nominal repetition starts in the start slot may be given by mod $$\mathrm{mod}\left(S + n \cdot L,\ N_{symb}^{slot}\right).$$

The slot where the $n^{th}$ nominal repetition ends may be given by $$K_s + \left\lfloor \frac{S + (n+1) \cdot L - 1}{N_{symb}^{slot}} \right\rfloor,$$

and the symbol where nominal repetition ends in the last slot may be given by $$\mathrm{mod}\left(S + (n+1) \cdot L - 1,\ N_{symb}^{slot}\right).$$

Here, n=0, . . . numberofrepetitions-1, S may represent the start symbol of the configured uplink data channel, and L may represent the symbol length of the configured uplink data channel. $K_s$ may indicate a slot in which PUSCH transmission starts and $$N_{symb}^{slot,x}$$

may indicate the number of symbols per slot.

The UE determines an invalid symbol for PUSCH repetitive transmission type B. A symbol configured for downlink by tdd-UL-DL-ConfigurationCommon or tdd-UL-DL-ConfigurationDedicated may be determined as the invalid symbol for PUSCH repeated transmission type B. In addition, the invalid symbol may be configured based on a higher layer parameter (e.g., InvalidSymbolPattern). As an example, the invalid symbol may be configured by providing a symbol level bitmap over one slot or two slots for the higher layer parameter (e.g., InvalidSymbolPattern). In this case, the bit indicated as 1 in the bitmap may indicate an invalid symbol. In addition, the period and pattern of the bitmap may be configured through a higher layer parameter (e.g., periodicityAndPattern). If a higher layer parameter (e.g., InvalidSymbolPattern) is configured and the InvalidSymbolPatternIndicator-ForDCIFormat0_1 or InvalidSymbolPatternIndicator-ForDCIFormat0_2 parameter indicates 1, the UE may apply the invalid symbol pattern, and may not apply the invalid symbol pattern if 0 is indicated. Alternatively, if a higher layer parameter (e.g., InvalidSymbolPattern) is configured and the InvalidSymbolPatternIndicator-ForDCIFormat0_1 or InvalidSymbolPatternIndicator-ForDCIFormat0_2 parameters are not configured, the UE may apply an invalid symbol pattern.

After an invalid symbol is determined in each nominal repetition, the UE may consider symbols excluding the determined invalid symbol as valid symbols. If each nominal repetition includes more than one valid symbol, the nominal repetition may include one or more actual repetitions. Here, each actual repetition may refer to a symbol actually used for repeated PUSCH transmission among the symbols configured as the nominal repetition, and may include a continuous set of valid symbols that may be used for repeated PUSCH transmission type B within one slot. The UE may omit actual repetition transmission when actual repetition having one symbol is configured to valid, except for the case where the symbol length of the configured uplink data channel is L=1. The redundancy version is applied according to the redundancy version pattern configured for each $n^{th}$ actual repetition.

Figure 5:
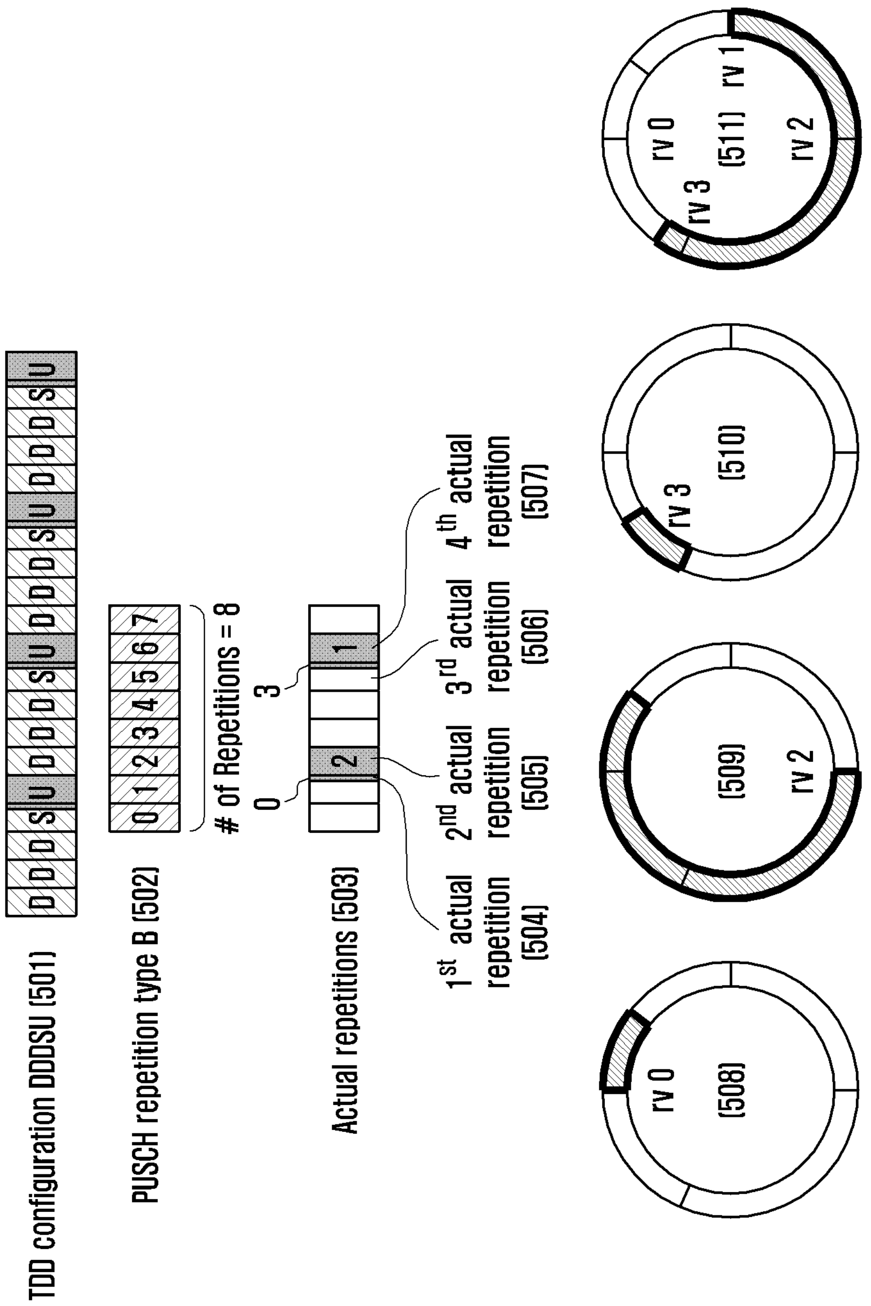
FIG. 5 is a diagram illustrating an example of PUSCH repeated transmission type B in a 5G system.

FIG. 5 is a diagram illustrating an example of PUSCH repeated transmission type B in a 5G system. The UE may configure the frame structure of time division duplexing (TDD) to 3 downlink slots, 1 special/flexible slot, and 1 uplink slot. Here, when the special/flexible slot consists of 11 downlink symbols and 3 uplink symbols, the initial transmission slot is the third in the second uplink transmission, and when the UE configures the index of the start symbol of the uplink data channel to 0 and the length of the uplink data channel to 14, and the number of repetitions repK=8, nominal repetition appears in 8 consecutive slots from the initial transmission slot (502). After that, the UE may determine the symbol configured as the downlink symbol in the frame structure 501 of the TDD system as an invalid symbol in each nominal repetition, and when valid symbols are composed of one or more consecutive symbols in one slot, they may be configured as actual repetition and transmitted (503).

Accordingly, a total of repK_actual=4 PUSCHs may be actually transmitted. In this case, when the repK-RV is configured to 0-2-3-1, the RV of the PUSCH of the first resource 504 actually transmitted is 0, the RV of the PUSCH of the second resource 505 actually transmitted is 2, the RV of the PUSCH of the third resource 506 actually transmitted is 3, and the RV of the PUSCH of the fourth resource 507 actually transmitted is 1. In this case, only PUSCHs with RV 0 and RV 3 may be decoded by themselves, and in the case of the first resource 504 and the third resource 506, because the PUSCH is transmitted only in 3 symbols much less than actually configured symbol length (14 symbols), the bit lengths 508 and 510 to be rate-matched are less than the bit lengths 509 and 511 calculated by the configuration.

Figure 6:
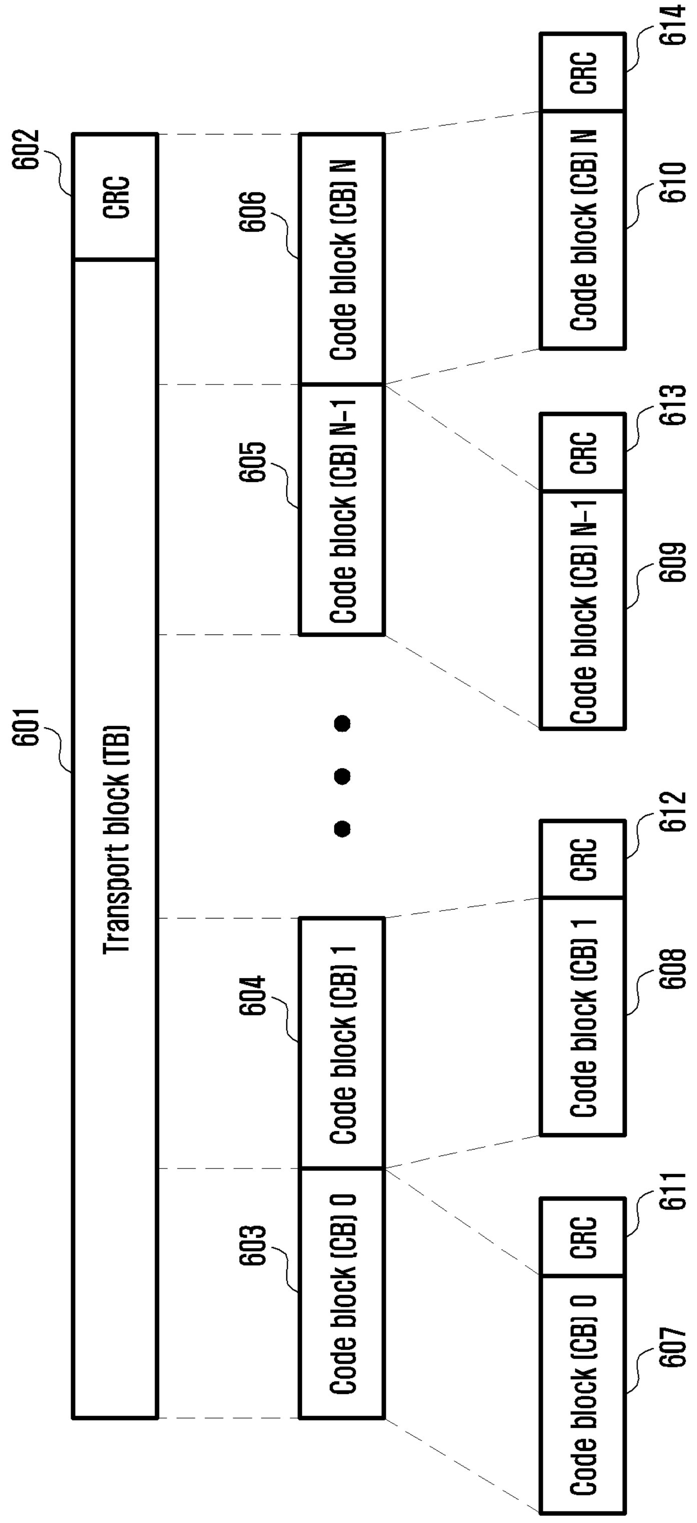
FIG. 6 is a diagram illustrating an example of a process in which one transport block (TB) is divided into several code blocks and a CRC is added in a 5G system.

FIG. 6 is a diagram illustrating an example of a process in which one transport block (TB) is divided into several code blocks (CBs) and a CRC is added in a 5G communication system. Referring to FIG. 6, a CRC 602 may be added to the end or front of one transport block (TB) 601 to be transmitted in uplink or downlink. The CRC 602 may have 17 bits, 25 bits, a pre-fixed number of bits, or a variable number of bits according to channel conditions, etc., and may be used to determine whether channel coding is successful. A block in which the CRC 602 is added to the TB 601 may be divided into several code blocks (CBs) 603, 604, 605, and 606. In this case, the maximum size of the code block (CB) may be pre-determined and divided, and in this case, the last code block (CB) 606 may have a smaller size than the other code blocks 603, 604, and 605. However, this is only one example, and according to another example, 0, an arbitrary value, or 1 is inserted into the last code block (CB) 606, so that the last code block (CB) 606 and the other code block 603, 604, and 605 may have the same length. In addition, CRCs 611, 611, 612, and 613 may be added to the code block (CB) 607, 608, 609, and 610, respectively. The CRC may have 17 bits, 24 bits, or a pre-fixed number of bits, and may be used to determine whether channel coding is successful. In order to generate the CRC 602, the TB 501 and a cyclic generator polynomial may be used, and the cyclic generator polynomial may be defined in various ways. For example, assuming that cyclic generator polynomial gCRC24A(D)=D24+D23+D18+D18+D14+D11+D10+D7+D6+D5+D4+D3+D+1 for a 24-bit CRC, and L=24, for TB data $_{a0,\ a1,\ a2,\ a3,\ \ldots\ aA-1}$, CRC $_{p1,\ p2,\ \ldots\ pL-1}$ may determine $_{p1,\ p2,\ \ldots\ pL-1}$ by dividing $_{a0}D^{A+23}+_{a1}D^{A+22}+\ \ldots\ _{aA-1}D^{24}+_{p0}D^{23}+_{p1}D^{22}\ \ldots\ _{p22}D^{1}+_{p23}$ by gCRC24A(D) so that the remainder is 0. In the above example, the CRC length L is assumed to be 24 as an example, but the CRC length L may be determined to be various lengths such as 12, 17, 24, 32, 40, 48, and 64. After the CRC is added to the TB in this process, the TB+CRC may be divided into N CBs 603, 604, 605, and 606. CRCs 611, 612, 613, and 614 may be added to each of the divided CBs 603, 604, 605, and 606. The CRC added to the CB may have a different length from when generating the CRC added to the TB, or a different cyclic generator polynomial may be used for generating the CRC. In addition, the CRC 602 added to the TB and the CRCs 611, 612, 613, and 614 added to the code block (CB) may be omitted depending on the type of code block (CB) to be applied to the code block (CB). For example, when an LDPC code rather than a turbo code is applied to a code block (CB), CRCs 611, 612, 613, and 614 to be inserted for each code block may be omitted. However, even when the LDPC is applied, the CRCs 611, 612, 613, and 614 may be added to the code block (CB) as it is. In addition, CRC may be added or omitted even when polar codes are used. As described above in FIG. 6, the maximum length of one code block (CB) may be determined according to the type of channel coding applied to the TB to be transmitted, and according to the maximum length of Code Block (CB), TB and CRC added to TB may be divided into code blocks. In the conventional LTE system, a CRC for CB is added to the divided CB, the data bits and CRC of the CB are encoded with a channel code and coded bits are determined, and the number of bits to be rate-matched (RM) is determined as promised in advance for each coded bit.

In the following, a method of calculating a transport block size (TBS) in a 5G system will be described in detail.

$N'_{RE}$, which is the number of REs allocated to PUSCH mapping in one PRB in the allocated resource is calculated. $N'_{RE}$ may be calculated as $$N_{sc}^{RB} \times N_{symb}^{sh} - N_{DMRS}^{PRB} - N_{oh}^{PRB}$$

Here, $$N_{sc}^{RB}$$

may be 12, and $$N_{symb}^{sh}$$

may indicate the number of OFDM symbols allocated to the PUSCH.

$$N_{DMRS}^{PRB}$$

is the number of REs in one PRB occupied by DMRSs of the same CDM group.

$$N_{oh}^{PRB}$$

is the number of REs occupied by overhead in one PRB configured by higher signaling, and may be configured to one of 0, 6, 12, and 18. Then, the total number of REs $N_{RE}$ allocated to the PUSCH may be calculated. $N_{RE}$ is calculated as $\min(166, N'_{RE}) \times n_{PRB}$, and $n_{PRB}$ represents the number of PRBs allocated to the UE. The number of temporary information bits $N_{info}$ may be calculated as $N_{RE} \times R \times Q_m \times v$. Here, R is a code rate and $Q_m$ is a modulation order, and information on this value may be transmitted by using the MCS bit field of DCI and a prearranged table. In addition, v is the number of assigned layers. If $N_{info} \leq 3824$, TBS may be calculated through the following process. Otherwise, TBS may be calculated through step 4. $N'_{info}$ may be calculated through the formula of $$N'_{info} = \max\left(24, 2^n \times \left\lfloor \frac{N_{info}}{2^n} \right\rfloor\right)$$

and $n = \max(3, \lfloor \log_2(N_{info}) \rfloor - 6)$. TBS may be determined to be the closest value to $N'_{info}$ among the values not less than $N'_{info}$ in Table 9 below.

TABLE 9

| Index | TBS |
|---|---|
| 1 | 24 |
| 2 | 32 |
| 3 | 40 |
| 4 | 48 |
| 5 | 56 |
| 6 | 64 |
| 7 | 72 |
| 8 | 80 |
| 9 | 88 |
| 10 | 96 |
| 11 | 104 |
| 12 | 112 |
| 13 | 120 |
| 14 | 128 |
| 15 | 136 |
| 16 | 144 |
| 17 | 152 |
| 18 | 160 |
| 19 | 168 |
| 20 | 176 |
| 21 | 184 |
| 22 | 192 |
| 23 | 208 |
| 24 | 224 |

TABLE 9-continued

| Index | TBS |
|---|---|
| 25 | 240 |
| 26 | 256 |
| 27 | 272 |
| 28 | 288 |
| 29 | 304 |
| 30 | 320 |
| 31 | 336 |
| 32 | 352 |
| 33 | 368 |
| 34 | 384 |
| 35 | 408 |
| 36 | 432 |
| 37 | 456 |
| 38 | 480 |
| 39 | 504 |
| 40 | 528 |
| 41 | 552 |
| 42 | 576 |
| 43 | 608 |
| 44 | 640 |
| 45 | 672 |
| 46 | 704 |
| 47 | 736 |
| 48 | 768 |
| 49 | 808 |
| 50 | 848 |
| 51 | 888 |
| 52 | 928 |
| 53 | 984 |
| 54 | 1032 |
| 55 | 1064 |
| 56 | 1128 |
| 57 | 1160 |
| 58 | 1192 |
| 59 | 1224 |
| 60 | 1256 |
| 61 | 1288 |
| 62 | 1320 |
| 63 | 1352 |
| 64 | 1416 |
| 65 | 1480 |
| 66 | 1544 |
| 67 | 1608 |
| 68 | 1672 |
| 69 | 1736 |
| 70 | 1800 |
| 71 | 1864 |
| 72 | 1928 |
| 73 | 2024 |
| 74 | 2088 |
| 75 | 2152 |
| 76 | 2216 |
| 77 | 2280 |
| 78 | 2408 |
| 79 | 2472 |
| 80 | 2536 |
| 81 | 2600 |
| 82 | 2664 |
| 83 | 2728 |
| 84 | 2792 |
| 85 | 2856 |
| 86 | 2976 |
| 87 | 3104 |
| 88 | 3240 |
| 89 | 3368 |
| 90 | 3496 |
| 91 | 3624 |
| 92 | 3752 |
| 93 | 3824 |

If $N_{info}$>3824, $N'_{info}$ may be calculated through the formulas of $$N'_{info} = \max\left(3840,\ 2^n \times \text{round}\left(\frac{N_{info} - 24}{2^n}\right)\right)$$

and $n=\lfloor \log_2(N_{info}-24)\rfloor-5$. TBS may be determined through the $N'_{info}$ value and the following pseudo-code 1. Below, C corresponds to the number of code blocks (CB) included in one TB.

Pseudo-code 1 start if R ≤ 1/4

$$TBS = 8*C*\left\lceil \frac{N'_{info} + 24}{8*C} \right\rceil - 24,$$

where $$C = \left\lceil \frac{N'_{info} + 24}{3816} \right\rceil$$

else if $N_{info}' > 8424$ $$TBS = 8*C*\left\lceil \frac{N'_{info} + 24}{8*C} \right\rceil - 24,$$

where $$C = \left\lceil \frac{N'_{info} + 24}{8424} \right\rceil$$

else $$TBS = 8*\left\lceil \frac{N'_{info} + 24}{8} \right\rceil - 24$$

end if end if

Pseudo-code 1 end

In order to improve the coverage of a transport channel in a wireless communication system, a transmission technology based on transport block processing over multi-slot (TBoMS), in which one transport block (TB) is mapped to a plurality of slots or a plurality of physical channels (e.g., PUSCH) and transmitted, is being discussed.

Figure 7:
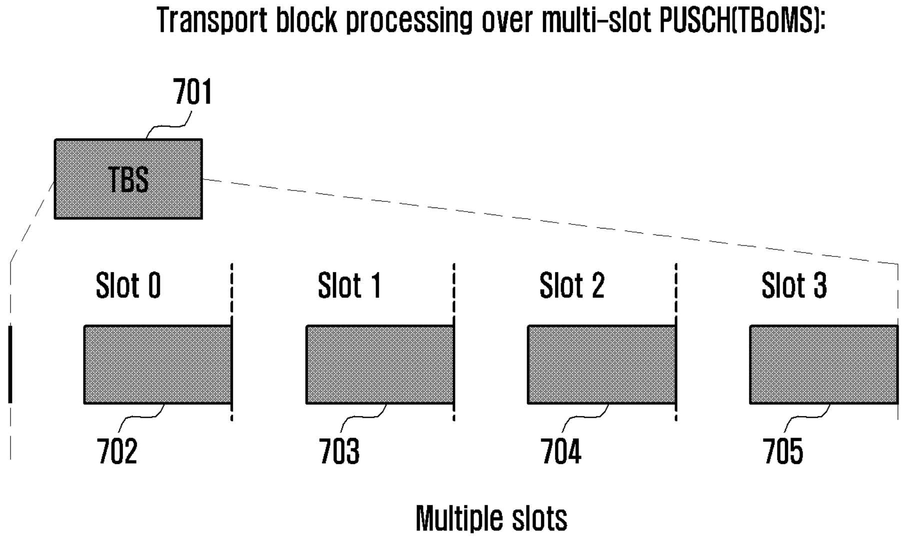
FIG. 7 is a diagram illustrating an example of physical channel transmission based on transport block processing over multi-slot (TBoMS) according to an embodiment of the disclosure.

FIG. 7 is a diagram illustrating an example of physical channel transmission based on transport block processing over multi-slot (TBoMS) according to an embodiment of the disclosure.

Referring to FIG. 7, one TB 701 may be allocated to a plurality of slots 702, 703, 704, and 705 and transmitted. Instead of allocating a plurality of small TBs to a plurality of slots, by allocating one TB to a plurality of slots, it is possible to reduce the ratio of CRC bits, obtain a channel coding gain through a low code rate, and improve channel coverage.

In the past, because one TB was mapped to one slot or one physical channel and transmitted, when the number of TBs and the number of transport slots (or the number of physical channels) to which the TBs are mapped differ, such as in TBoMS, a signal processing procedure in the physical layer needs to be newly designed. Hereinafter, in the disclosure, the signal processing technology for the case where the number of TBs and the number of slots (or the number of physical channels) for transmitting the corresponding TB is different is referred to as 'asymmetric signal processing', but the name is for illustrative purposes only and does not limit the scope of the disclosure. The disclosure proposes procedures in the overall physical layer including DCI format design, TBS determination, code block (CB) division, rate matching, interleaving, CB concatenation, multiplexing, and scrambling for such asymmetric signal processing. Hereinafter, some embodiments will be described based on a signal processing procedure in the physical layer for data transmission for description, but the corresponding physical layer signal processing procedure may also be applied for data reception.

Hereinafter, the disclosure will be described based on the PUSCH of the NR system, but TBoMS in which one TB is transmitted through a plurality of slots will be described as an example. However, this is for illustrative purposes only and does not limit the scope of the disclosure and may be applied for any asymmetric signal processing. In addition, in some descriptions of the disclosure below, TBoMS-based PUSCH transmission is described as an example, but this is only for example and does not limit the scope of the disclosure, and it may be applied for any physical channel transmission including PUSCH/PDSCH/PSSCH transmission through predefined/configured or signaling between a base station and a UE. In addition, in some descriptions of the disclosure below, slots and PUSCHs will be used interchangeably, but it may be understood that a slot is replaced with a PUSCH or a PUSCH is replaced with a slot on the premise that one PUSCH is transmitted in one slot. However, the disclosure may be equally applied even when a plurality of PUSCHs are transmitted in one slot or one PUSCH is transmitted over a plurality of slots. In this case, one slot should naturally be understood as one PUSCH. In some examples below, although the operation of a UE or a base station has been described based on the operation of the UE or base station, the base station (or other UE) or the UE may also perform a corresponding operation to support the operation of the corresponding UE or base station. Hereinafter, each embodiment and signal processing procedure of the disclosure may be applied independently or in combination with one or more of them.

A physical layer signal processing for TBoMS described in the disclosure may be performed when TBoMS is configured to the UE through TBoMS configuration information. The TBoMS configuration information may be configured through any signaling including RRC signaling, system information, MAC or DCI, and may include any information used to perform the physical layer signal processing for TBoMS described below. For example, TBoMS configuration information may include information on the number of slots to which one TB is mapped in TBoMS.

For example, the TBoMS configuration may be a detailed item of PUSCH configuration, and each PUSCH configuration may be a detailed item of BWP configuration. Accordingly, when one cell operates a plurality of BWPs, the TBoMS method may operate only in some BWPs of the cell.

In addition, within one BWP, if TBoMS configuration is transmitted based on system information, the TBoMS configuration may be applied to PUSCH in the initial access process, and if transmitted based on dedicated RRC signaling thereafter, the TBoMS configuration may be applied to PUSCH transmission in RRC connected state. If there is no transmission based on system information and transmission is performed based on dedicated RRC signaling, the TBoMS configuration may be applied only to PUSCH transmission in an RRC connected state.

In addition, the number of REs appearing in the following description is a value corresponding to the number of RBs and the number of time resources (number of OFDM symbols) used for PUSCH transmission, and the number of REs may be replaced with the number of RB s and time resources (number of OFDM symbols) used for PUSCH transmission in the following operation based on the number of Res.

DCI Format

A DCI format design method for TBoMS according to an embodiment of the disclosure is disclosed.

According to an embodiment, an arbitrary DCI format may be used for TBoMS. However, because it is not desirable to transmit a lot of data together to obtain a coding gain, the UE and the base station may assume that the remaining TBs except for the first TB are always deactivated for a DCI format (e.g., DCI format 0_1 or 1_1, etc.) supporting a plurality of TBs when TBoMS is configured. For a DCI format supporting multiple TBs, the UE may not expect DCI reception indicating activation of the remaining TB s except for the first TB, or if DCI indicating activation of the remaining TB s is received, the UE may not perform PDSCH/PUSCH transmission scheduled by the corresponding DCI or may not perform PDSCH/PUSCH transmissions corresponding to the remaining TBs except for the first one.

On the other hand, when an arbitrary DCI format is allowed, the number of bits to be received by the UE increases for the DCI format supporting a plurality of TBs, and physical channel resources may be wasted and the burden of signal processing of the UE may increase. Accordingly, in order to further improve performance in asymmetric signal processing such as TBoMS, only a DCI format (e.g., DCI format 0_0 or 1_0) supporting a maximum of one TB may be used.

Figure 8:
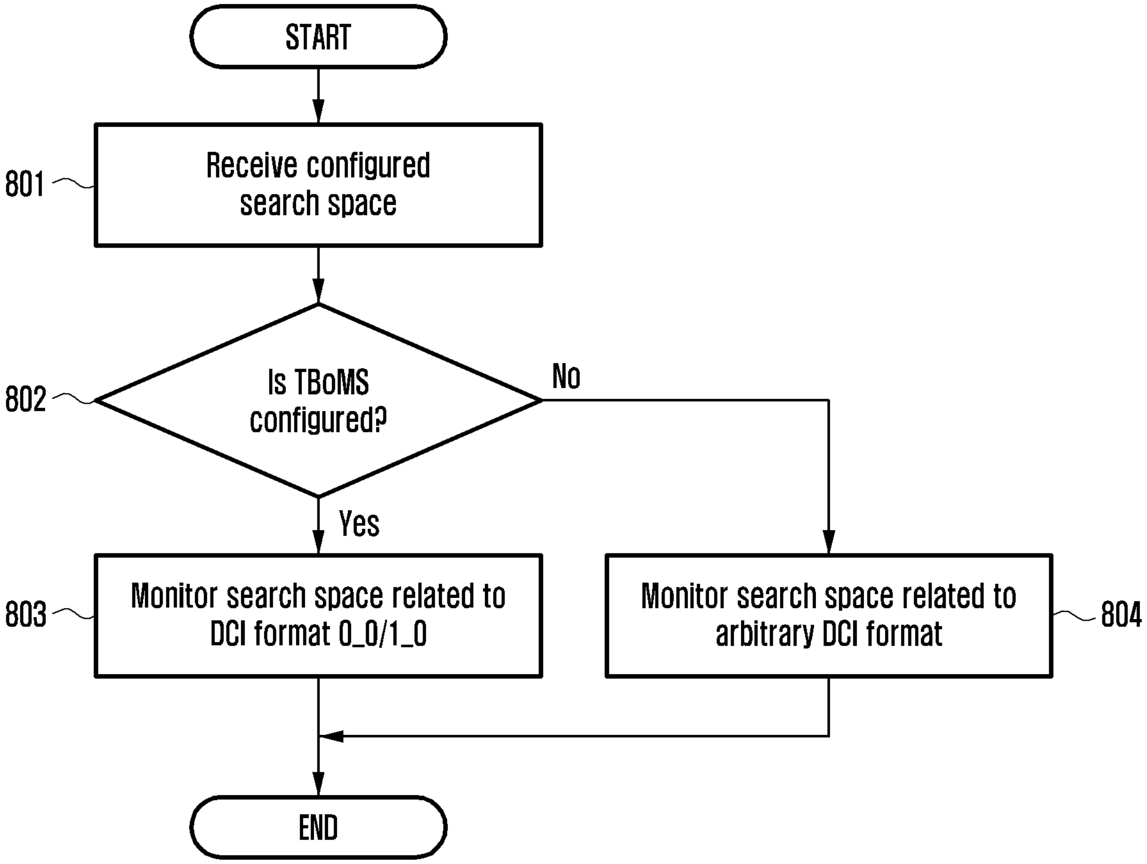
FIG. 8 is a diagram illustrating an example of TBoMS transmission using a DCI format supporting only one TB according to an embodiment of the disclosure.

FIG. 8 is a diagram illustrating an example of TBoMS transmission using a DCI format supporting only one TB according to an embodiment of the disclosure.

Referring to FIG. 8, a UE may receive a configured search space for monitoring a DCI format through higher layer signaling through a base station (801). The UE may determine whether TBoMS is configured, that is, whether TBoMS configuration information is received (802). If TBoMS is configured, the UE may perform monitoring only for a search space related to a DCI format supporting only one TB, for example, DCI format 0_0 or 1_0, among search spaces configured through higher layer signaling (803). If TBoMS is not configured, the UE may monitor an arbitrary DCI format corresponding to the search space in the search space configured through higher layer signaling (804). The operation of the UE and the base station when the TBoMS is configured will be described in more detail as follows.

In an embodiment, when the TBoMS is configured, the UE may monitor a search space for monitoring a DCI format (e.g., DCI format 0_0 or 1_0) supporting only one TB of the configured search space, and may not monitor a search space for monitoring a DCI format (e.g., DCI format 0_1 or 1_1) supporting a plurality of TBs. Accordingly, the UE may monitor only DCI format 0_0 or 1_0 and perform TBoMS-based PDSCH/PUSCH/PSSCH transmission and reception based on this.

In an embodiment, when TBoMS is configured, the base station and the UE may assume that only a search space for monitoring DCI format 0_0 or 1_0 is configured. That is, when TBoMS is configured, the base station and the UE may not expect that a search space for monitoring other DCI formats other than DCI format 0_0 or 1_0 is configured. Accordingly, the UE may monitor only DCI format 0_0 or 1_0 based on the configured search space and perform TBoMS-based PDSCH/PUSCH/PSSCH transmission/reception based on this. On the other hand, according to another embodiment, a DCI format for TBoMS or a search space for monitoring the DCI format for TBoMS may be configured in the UE through TBoMS configuration information. When the TBoMS configuration information indicates a specific DCI format, the UE may monitor only the search space for the DCI format indicated through the TBoMS configuration information among the search spaces configured for the UE. Alternatively, when the TBoMS configuration information includes information on the search space for the specific DCI format, the UE may monitor the search space included in the TBoMS configuration information. In this embodiment, the information included in the TBoMS configuration information may include DCI format 0_0 or 1_0, but is not necessarily limited thereto.

UE Identifier for DCI Format

A UE identifier for DCI format for TBoMS according to an embodiment of the disclosure is disclosed.

In an embodiment, the DCI format for TBoMS may include a CRC scrambled with a specific radio network temporary identifier (RNTI). For example, in the case of a DCI format (e.g., DCI format 0_0) for scheduling a PUSCH, a CRC scrambled with C-RNTI (cell RNTI) or TC-RNTI (temporary C-RNTI) may be included. In addition, in the case of a DCI format (e.g., DCI format 1_0) for scheduling a PDSCH, a CRC scrambled with C-RNTI, TC-RNTI, paging RNTI (P-RNTI), random access RNTI (RA-RNTI), or system information RNTI (SI-RNTI) may be included.

Here, the TC-RNTI may be used for DCI scheduling Msg3 PUSCH transmission used in the random access procedure. In this case, the UE and the base station may operate as follows, depending on whether the random access procedure related to the TC-RNTI is an initial access procedure or not.

In the case of initial connection, TBoMS operation according to DCI reception including a CRC scrambled with TC-RNTI may be performed based on TBoMS configuration information included in RACH-config common included in SIB1. In cases other than initial access, TBoMS operation according to DCI reception including a CRC scrambled with TC-RNTI may be performed based on TBoMS configuration information configured through Dedicated RRC. In this case, TBoMS configuration information configured through Dedicated RRC may be included, for example, in PUSCH-config or RACH-config dedicated. According to an embodiment, when Msg 3 is transmitted in a plurality of slots, a transmission operation of a corresponding preamble (Msg 1) may also be performed through a plurality of slots or RACH Occasion. Depending on the configuration, when information on the number of transmissions of the preamble (Msg 1) is separately defined or when the corresponding Msg 3 is transmitted in a plurality of slots, a plurality of preambles (Msg 1) may also be implicitly transmitted.

Figure 9:
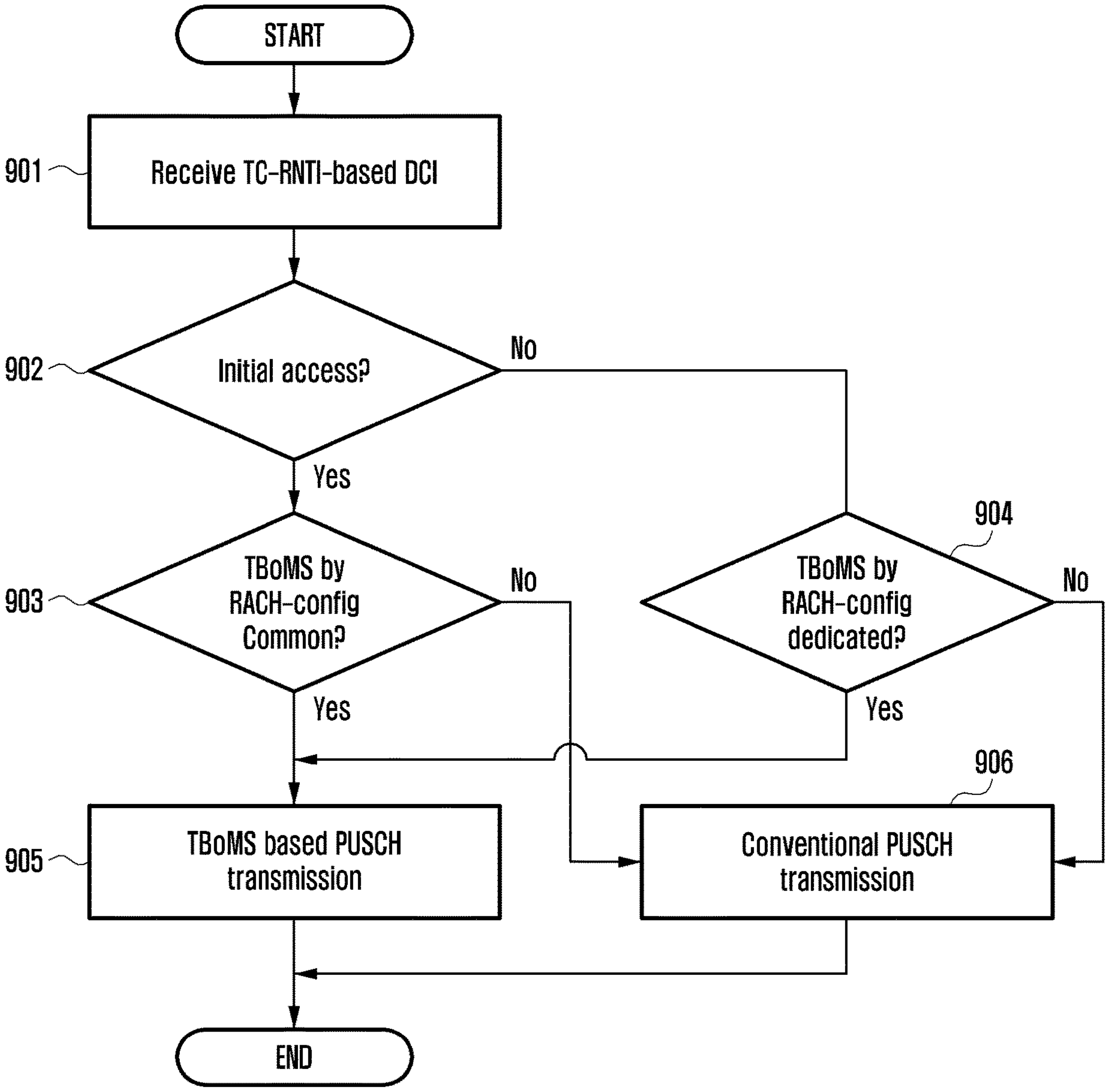
FIG. 9 is a diagram illustrating TBoMS operation according to reception of DCI including a CRC scrambled with temporary cell radio-network temporary identifier (TC-RNTI) according to an embodiment of the disclosure.

FIG. 9 is a diagram illustrating TBoMS operation according to reception of DCI including a CRC scrambled with TC-RNTI according to an embodiment of the disclosure.

Referring to FIG. 9, when receiving the TC-RNTI-based DCI (901), the UE may determine whether the PUSCH scheduled by the corresponding DCI is for initial access (902). If it is for initial access, the UE may determine whether TBoMS configuration information is included in information configured to common through SIB1 or in RACH configuration information therein (903). If the TBoMS configuration information is included, the UE may perform TBoMS-based PUSCH transmission, that is, PUSCH transmission in a plurality of slots (905). If the TBoMS configuration information is not included, the UE may perform PUSCH transmission in one slot according to a conventional method (906). On the other hand, if it is not for initial access, the UE may determine whether TBoMS configuration information is included in RACH configuration information dedicated through RRC (904). If the TBoMS configuration information is included, the UE may perform TBoMS-based PUSCH transmission, that is, PUSCH transmission in a plurality of slots (905). If the TBoMS configuration information is not included, the UE may perform PUSCH transmission in one slot according to a conventional method (906).

Design of DCI Format

In the following description, it is assumed that one DCI is related to transmission of a plurality of PUSCHs. However, even when a plurality of DCIs schedule one TB for a plurality of PUSCH transmissions, the following content may be equally applied. On the other hand, in a system for obtaining coding gain and channel coverage improvement, it is advantageous to increase transmission power through a small band and a large number of time resources without requiring a high MCS. Accordingly, in the case of TBoMS, the bit size of a modulation and coding scheme (MCS) for indicating an MCS and a frequency domain resource allocation (FDRA) for indicating a frequency resource among information indicated through DCI may be reduced. For example, when using only the lower N MCSs among all MCSs indicated by the existing 5-bit MCS field for the MCS field, only $\lceil \log_2 N \rceil$-sized bits may be used instead of the existing 5 bits. N may be determined based on TBoMS configuration information, the TBoMS configuration information may include information directly indicating the number N of MCSs to be used as information for determining N, or information indicating an MCS index, and it may be assumed that the base station and the UE use the MCS corresponding to the index below the indicated index. In addition, for example, for the FDRA field, when the maximum number of PRBs for TBoMS is configured through TBoMS configuration information, because the RIV value for indicating the number of PRBs exceeding the maximum number of PRB s is not required, the number of bits for FDRA may be reduced accordingly.

Regarding hybrid automatic repeat request acknowledgement (HARQ-ACK) operation, in the case of PUSCH, when even one of the plurality of PUSCHs is acknowledgement (ACK), it may be determined as ACK (retransmission DCIs for the plurality of PUSCHs corresponding to the DCI are not transmitted), and when all PUSCHs are negative acknowledgement (NACK), NACK may be transmitted (retransmission DCIs for the plurality of PUSCHs corresponding to the DCI are transmitted). In contrast, when even one of the plurality of PUSCHs is NACK, NACK may be transmitted (retransmission DCIs for the plurality of PUSCHs corresponding to the DCI are transmitted), and when all PUSCHs are ACKs, ACKs may be determined (retransmission DCIs for a plurality of PUSCHs corresponding to DCIs are not transmitted). The former is suitable when ACK/NACK of the entire TB may be determined through one PUSCH, and the latter is suitable when ACK/NACK for the entire TB may be determined only after receiving all PUSCHs. A detailed description of this may be understood through the following technical description (procedures such as code block division and transmission rate matching).

When applied to PDSCH for HARQ-ACK operation, if the UE receives configuration of the dynamic HARQ-ACK codebook, the UE may determine the HARQ-ACK feedback bit or HARQ-ACK codebook size to be transmitted by the UE based on downlink assignment indicator (DAI) information included in the DCI in a slot in which HARQ-ACK information determined according to K0, which is the slot information to which the PDSCH is mapped, and the HARQ-ACK feedback timing information K1 value for the PDSCH are transmitted. If a plurality of PDSCHs are scheduled through one DCI indicating DAI according to an embodiment of the disclosure, a method of determining the DAI value or a method of determining the HARQ-ACK feedback bit or HARQ-ACK codebook size based on the DAI value may be required.

In an embodiment, the DAI may be sequentially increased for each DCI in consideration of the cell as before, and the UE may perform one HARQ-ACK feedback for a plurality of PDSCHs. The one HARQ-ACK feedback is based on the decoding result of all PDSCHs, and for example, if any one of a plurality of PDSCHs is ACK, ACK may be transmitted, and if all PDSCHs are NACK, NACK may be transmitted. Alternatively, if even one of the plurality of PDSCHs is NACK, NACK may be transmitted, and if all PDSCHs are ACK, ACK may be transmitted. HARQ-ACK transmission timing may be determined based on the reception time of the last PDSCH (e.g., the last symbol of the last PDSCH). When code block group (CBG)-based PDSCH transmission is configured, HARQ-ACK feedback may be performed for each CBG.

In an embodiment, the DAI may be sequentially increased for each DCI in consideration of the cell as before, and the UE may perform HARQ-ACK feedback for each of a plurality of PDSCHs. In this case, the same HARQ-ACK may be fed back for a plurality of PDSCHs scheduled by DCI indicating one DAI, and the same HARQ-ACK feedback may be fed back as much as the number of PDSCHs (or slots) scheduled through the corresponding DCI. This may be effective when TB s transmitted on a plurality of PDSCHs are the same, but multiplexed control information is different for each PDSCH or is included only in some PDSCHs.

In an embodiment, the DAI may be configured to sequentially increase in consideration of the number of PDSCHs related to each DCI together with the cell, and based on the corresponding DAI value, the UE may perform HARQ-ACK feedback for each of a plurality of PDSCHs.

DCI format 0_0 according to the above description may be described as follows.

If DCI format 0_0 is applied to scheduling of a plurality of PUSCHs, each field below will be used for each PUSCH transmission.

In particular, in the case of the redundancy version, the interpretation method will be explained in detail in the transmission rate matching part. In addition, it is configured that one same HARQ process number is applied to all PUSCHs. The transmit power control (TPC) command configures that the same value is applied to all PUSCHs. However, if joint channel estimation is not applied and there is a TPC command transmitted at an applicable point after the corresponding TPC command (TPC command transmitted through DCI format 2_2, etc.), this will be applied. Finally, in the case of TDRA, the existing 4 bits are used as they are, but based on the TDRA list stored in the UE or base station, Dedicated RRC or SIB configuration, etc., information on the number of PUSCHs may be additionally included in addition to the information of the existing TDRA.

The following description relates to bit size determination, and a specific interpretation method will follow the above-mentioned.

DCI format 0_0: PUSCH scheduling within one cell

UE identifier: C-RNTI or TC-RNTI

Identifier for DCI formats—1 bit

Frequency domain resource assignment—m bits: m is determined according to the description of the disclosure Time domain resource assignment—4 bits: Determined according to the existing standard method Frequency hopping flag—1 bit: Determined according to the existing standard method Modulation and coding scheme—y bits: y is determined according to the description of the disclosure New data indicator—1 bit Redundancy version—2 bits: Determined according to the existing standard method HARQ process number—4 bits TPC command for scheduled PUSCH—2 bits: Determined according to the existing standard method Padding bits, if required.

UL/SUL indicator—1 bit: Determined according to the existing standard method

TBS Determination

A method for determining a transport block size (TBS) for TBoMS according to an embodiment of the disclosure is disclosed.

In an embodiment, TBS may be determined based on the total number of resource elements (REs) allocated to PUSCHs transmitted in a plurality of slots.

In an embodiment, if the same number of REs are allocated to PUSCHs transmitted in all slots related to one TB transmission, TBS may be determined based on the same number of REs. That is, TBS may be determined based on the number of REs allocated to the PUSCH transmitted in one slot.

In an embodiment, if REs are independently allocated to PUSCHs transmitted in each slot associated with one TB transmission (i.e., allowing different numbers of REs to be allocated), TBS may be determined based on any one of the following methods.

1. TBS may be determined based on the number of REs allocated to the PUSCH of a specific predefined slot among a plurality of slots. For example, TBS may be determined based on the number of REs allocated to the PUSCH of the first or last slot among a plurality of slots.
2. A slot to be used for TBS calculation may be directly configured through RRC or MAC, or a condition for determining a slot to be used for TBS calculation may be configured. TBS may be determined based on the configured slot or a slot determined according to conditions.
3. TBS may be determined based on the largest or smallest number of REs allocated to the PUSCH of each slot.
4. TBS may be determined based on the average of the number of REs allocated to the PUSCH of all slots.

The TBS determination method based on the above embodiments may be predefined/configured or configured through signaling (RRC, system information, MAC, DCI, . . . ) between the base station and the UE.

According to an embodiment, the TBS determined according to the above embodiments may be determined to be equal to or less than the maximum TBS for TBoMS transmission. For example, when designing DCI, the base station may adjust or limit parameters used in the TBS calculation process so that the TBS calculated according to the above embodiments is equal to or less than the maximum TBS for TBoMS. As such, a UE receiving the DCI designed such that the TBS is calculated to be equal to or less than the maximum TBS may calculate the TBS based on the received DCI. As another example, the maximum TBS may be configured through signaling between the base station and the UE. For example, the maximum TBS may be included in TBoMS configuration information and configured to the UE. If the TBS calculated by the UE is greater than the configured maximum TBS, the UE may not perform PUSCH transmission for the corresponding TB, or may perform PUSCH transmission by using the configured maximum TBS instead of the calculated TBS. Of course, the above two examples may be implemented independently of each other or in combination. The maximum TBS for the TBoMS may be configured to one value independent of a modulation order, or the maximum TBS corresponding to each modulation order may be configured. When the maximum TBS corresponding to each modulation order is configured, the base station and the UE may perform the above-described operation in consideration of the modulation order determined through the MCS field. When the TBS is determined as described above, a CRC bit may be attached to the TB having the determined TBS. The CRC bit attached to the TB may be 24 bits.

CB Segmentation

A code block (CB) division method for TBoMS according to an embodiment of the disclosure is disclosed.

In an embodiment, CB segmentation may not be supported in case of TBoMS-based transmission. That is, considering high coding gain in TBoMS, it is preferable to transmit a small-sized TB, and in this case, CB splitting may not occur.

When the CB segmentation is not supported, the base station may design and transmit the DCI to the UE so that the TBS is calculated to be equal to or less than the size required for the CB segmentation. When TBoMS is configured (i.e., when TBoMS configuration information is received), the UE may not expect DCI reception that causes TBS to exceed the size required for the CB segmentation. If received, the UE may not perform transmission of the physical channel scheduled by the corresponding DCI.

Alternatively, the base station or the UE may configure the maximum TBS size for the TBoMS described in the TBS determination method above to be equal to or less than the TBS required for the CB segmentation.

Alternatively, if the calculated TBS exceeds the TBS for which CB segmentation is required, the base station or the UE may scale the calculated TBS to be equal to or less than the TBS for which CB segmentation is required.

Alternatively, the base station or the UE may not perform the CB segmentation when TBoMS is configured, regardless of the calculated TBS and the TBS for which CB segmentation is required.

In one embodiment, the CB segmentation may be supported for TBoMS-based transmission.

When the segmentation is supported, the base station and the UE may determine the number of CBs and the size of each CB with reference to TS 38.212 Section 5.2 of Release 15 according to the size of the TBS, and for example, the number of CBs and the size of each CB may be determined based on Table 10 below.

TABLE 10

5.2 Code block segmentation and code block CRC attachment
5.2.1 Polar coding
The input bit sequence to the code block segmentation is denoted by $a_0, a_1, a_2, a_3, \ldots, a_{A-1}$, where $A > 0$.
if $I_{seg} = 1$
  Number of code blocks: C = 2;
else TABLE 10-continued

```
  Number of code blocks: C = 1
end if
A' = ⌈A/C⌉ · C;
for i = 0 to A' − A − 1
  a'_i = 0;
end for
for i = A' − A to A' − 1
  a'_i = a_{i−(A'−A)};
end for
s = 0;
for r = 0 to C − 1
  for k = 0 to A'/C − 1
      c_rk = a'_s;
      s = s + 1;
  end for
  The sequence c_r0, c_r1, c_r2, c_r3, ..., c_r(A'/C−1) is used to calculate
      the CRC parity bits p_r0, p_r1, p_r2, ..., p_r(L−1) according to
      Subclause S.1 with a generator polynomial of length L.
  for k = A'/C to A'/C + L − 1
      c_rk = p_r(k−A'/C);
  end for
end for
The value of A is no larger than 1706
```

5.2.2 Low density parity check coding
The input bit sequence to the code block segmentation is denoted by $b_0, b_1, b_2, b_3, \ldots, b_{B-1}$, where $B > 0$. If B is larger than the maximum code block size $K_{cb}$, segmentation of the input bit sequence is performed and an additional CRC sequence of L = 24 bits is attached to each code block.
For LDPC base graph 1, the maximum code block size is:
- $K_{cb} = 8448$.
For LDPC base graph 2, the maximum code block size is:
- $K_{cb} = 3840$.
Total number of code blocks C is determined by:

```
if B ≤ K_cb
      L = 0
  Number of code blocks: C = 1
      B' = B
else
      L = 24
  Number of code blocks: C = ⌈B/(K_cb − L)⌉.
      B' = B + C · L
end if
```

The bits output from code block segmentation are denoted by $c_{r0}, c_{r1}, c_{r2}, c_{r3}, \ldots, c_{r(K_r-1)}$, where $0 \le r < C$ is the code block number, and $K_r = K$ is the number of bits for the code block number r.
The number of bits K in each code block is calculated as:

```
  K' = B'/C;
  For LDPC base graph 1,
      K_b = 22.
  For LDPC base graph 2,
      if B > 640
        K_b = 10;
      elseif B > 560
        K_b = 9;
      elseif B > 192
        K_b = 8;
      else
        K_b = 6;
      end if
  find the minimum value of Z in all sets of lifting sizes in
  Table 5.3.2-1, denoted as Z_c, such that K_b · Z_c ≥ K', and
set K = 22Z_c for LDPC base graph 1 and K = 10Z_c for LDPC
base graph 2;
The bit sequence c_rk is calculated as:
  s = 0;
  for r = 0 to C − 1
      for k = 0 to K' − L − 1
        c_rk = b_s;
        s = s + 1;
      end for
      if C > 1
        The sequence c_r0, c_r1, c_r2, c_r3, ..., c_r(K'−L−1) is used to
         calculate the CRC parity bits p_r0, p_r1, p_r2, ..., p_r(L−1)
         according to Subclause 5.1 with the generator polynomial
         g_CRC24B(D).
        for k = K' − L to K' − 1
          c_rk = p_r(k+L−K');
```

TABLE 10-continued

```
        end for
      end if
      for k = K' to K − 1   -- Insertion of filler bits
        c_r,k =< NULL >;
      end for
end for
```

Alternatively, the number of divided CBs may be equal to the number of slots (or physical channels) for TBoMS or may be determined to be a multiple of the number of slots (or PUSCHs). Here, the number of slots for TBoMS may be configured through TBoMS configuration information.

If the number of CBs determined based on the conventional method described above is equal to or a multiple of the number of slots for TBoMS, the same number of CBs may be mapped to and transmitted to each physical channel (e.g., PUSCH). For example, when the number of slots for TBoMS is configured to 4 in PUSCH transmission and the determined number of CBs is 4, one CB may be mapped to each PUSCH of each slot and transmitted.

In contrast, when the number of CB s determined based on the conventional method is not the same as or is not multiple of the number of slots for TboMS, the CB may be re-divided into the same number or multiple.

If the determined number of CBs is smaller than the number of slots for TBoMS, the CB may be re-divided into smaller CBs to match the number of corresponding slots. For example, when the number of slots for TBoMS in PUSCH transmission is configured to 4 and the determined number of CBs is 2, the TB may be re-divided into 4 CBs having smaller sizes. The four re-segmented CBs may be transmitted after being mapped one by one to the PUSCH of each slot.

If the number of CBs is greater than the number of slots for TBoMS, the CB may be re-divided into smaller or larger CBs to match the number of slots or to be a multiple of the number of slots. For example, when the number of slots for TBoMS in PUSCH transmission is configured to 4 and the determined number of CBs is 6, the TB may be re-divided into 4 CB s having a larger size. The four re-segmented CBs may be transmitted after being mapped one by one to the PUSCH of each slot. As another example, the TB may be re-divided into 8 CBs having a smaller size. The eight re-segmented CBs may be transmitted after being mapped to two PUSCHs of each slot.

Whether CB segmentation is supported for TBoMS-based transport or when supported or not supported, which methods are used respectively may be predefined/configured or configured through signaling (RRC, system information, MAC, DCI, . . . ) between the base station and the UE.

CB CRC Attachment

A CB CRC attachment method for TBoMS according to an embodiment of the disclosure is disclosed.

If the CB segmentation is not supported, a separate CB CRC attachment operation may not be required because the CRC is attached to the TB.

If CB segmentation is supported, the CRC attachment operation for the divided CB may be performed according to the method below.

In an embodiment, a 24-bit CRC may be attached to each CB as in the prior art.

In another embodiment, a smaller size CRC bit may be used in the case of TBoMS instead of the conventional 24 bits to minimize redundancy for high coding gain. For example, a 16-bit CRC may be attached to each CB, or a CRC of an arbitrary size newly defined in relation to TBoMS may be attached to each CB. This embodiment may also include a case in which a 0-bit CRC is used, that is, a separate CRC is not attached even if the CB segmentation is supported.

In the case of supporting transmission based on a code block group (CBG), the CRC may be attached in units of CBGs instead of each CB.

In the disclosure, whether the CB segmentation is supported, or the CB CRC attachment method for the case where it is supported, may be predefined/configured or configured through signaling (RRC, system information, MAC, DCI, . . . ) between the base station and the UE.

Channel Coding

As described above, the channel coding may be performed on a CB to which a CRC is attached (or, if CB segmentation is not supported, a TB to which a CRC is attached). The Channel coding may be performed based on at least one of LDPC codes, polar codes, and simplex codes.

Rate Matching

A rate matching or bit selection method for TBoMS according to an embodiment of the disclosure is disclosed. An embodiment described below may be applied to a rate matching operation for channel coding based on an LDPC code, a polar code, or a simplex code.

In an embodiment, one rate matching may be performed over the entire number of slots configuration for TBoMS. That is, for bits output through channel coding, rate matching or bit selection may be performed based on the number of REs of all PUSCHs transmitted in slots for TBoMS and the RV indicated by DCI. In this case, bits corresponding to the number of REs of each PUSCH will be sequentially allocated to each PUSCH. This has the same effect as sequentially applying RV to each PUSCH. However, as a method for determining the starting time point of bits allocated to each PUSCH, a method in which the next bit of the bit allocated to the previous PUSCH among all selected bits becomes the starting time point of the bit allocated to the current PUSCH may be applied, rather than the method described in the existing standard.

In an embodiment, rate matching or bit selection may be performed for each slot according to the number configured for TBoMS.

In this case, if the PDSCH/PUSCH transmitted in all slots has the same number of REs and the same RV, rate matching or bit selection may be substantially performed only once, and the result of the one-time execution may be equally used for PDSCH/PUSCH transmission in each slot. In this case, for all PDSCHs/PUSCHs, bits according to the same RV may be determined to have the same bit size in the channel coding result.

Alternatively, when PDSCH/PUSCH transmitted in all slots have the same number of REs but have respective RVs, rate matching or bit selection may be performed for each RV. In this case, for each PDSCH/PUSCH, bits corresponding to each RV in the channel coding result may be determined to have the same bit size. In this case, assuming that DCI indicates only one RV value, the RV value of the PDSCH/PUSCH of each slot may be determined sequentially (e.g., 0→2→3→1, 2→3→1→0 . . . ) through a modulo formula similar to the PUSCH repetition operation. The order may be determined through RRC signaling.

Alternatively, when PDSCH/PUSCH transmitted in all slots have the same RV but have respective number of REs, rate matching or bit selection may be performed for each number of REs. In this case, for each PDSCH/PUSCH, the number of bits corresponding to each bit size determined according to the number of REs in the channel coding result may be determined based on the same RV.

Alternatively, when PDSCH/PUSCH transmitted in each slot has each RE number and RV, rate matching or bit selection may be performed for each RE number and RV. In this case, for each PDSCH/PUSCH, bits corresponding to each bit size determined according to the number of REs in the channel coding result may be determined through a part corresponding to each RV.

In the present disclosure, whether to perform rate matching over all slots or whether to perform rate matching for each slot may be predefined/configured or may be configured through signaling (RRC, system information, MAC, DCI, . . . ) between the base station and the UE. In addition, when rate matching is performed for each slot, whether to use one of the methods described above may be predefined/configured, configured through signaling (RRC, system information, MAC, DCI, . . . ) between the base station and the UE, or may be switched as needed.

If CB segmentation is supported, rate matching may be performed for each CB. When the CB segmentation is performed according to the above-described embodiment and a different CB is mapped for each PDSCH/PUSCH of each slot, the RV to be applied for the rate matching for each CB may be determined sequentially (e.g., 0→2→3→1, 2→3→1→0 . . . ) through a modulo formula similarly to the PUSCH repetition operation, or the same RV value may be used for all CBs.

In one embodiment, the number of bits determined through bit selection in the rate matching step may be determined by considering the number of bits multiplexed in the PUSCH of each slot, which will be described later, and the number of bits of each PUSCH determined through bit selection may be different according to the multiplexing method. For example, when the number of bits determined based on the number of REs allocated to the PUSCH of a specific slot is 120, if there is no uplink control information (UCI) multiplexing in the corresponding slot, 120 bits may be output through bit selection. On the other hand, when 16-bit UCI multiplexing is required in the corresponding slot, 104 bits may be output through bit selection by considering bits to be added for the multiplexing.

Interleaving

An interleaving method for TBoMS according to an embodiment of the disclosure is disclosed.

In an embodiment, when TBoMS is configured, the interleaving may be performed on all bits output through rate matching.

In an embodiment, when TBoMS is configured, the interleaving may be performed between bits mapped to the same slot (or PUSCH) among bits output through rate matching. In this case, if different CBs are mapped for each PUSCH, the interleaving may be performed only between selected bits corresponding to each CB. Alternatively, if selected bits transmitted on each PUSCH are different even if different CBs are not mapped for each PUSCH, the interleaving may be performed between corresponding selected bits of each PUSCH.

In the disclosure, whether the interleaving for all bits or the slot-based interleaving is performed may be predefined/configured or configured through signaling (RRC, system information, MAC, DCI, . . . ) between the base station and the UE.

CB Concatenation

A CB concatenation method for TBoMS according to an embodiment of the disclosure is disclosed. In this paragraph, it is described as CB coupling, but when considering the rate matching or interleaving, it may also be referred to as rate matching block coupling or interleaving block coupling.

If the CB segmentation is not supported, or if one rate matching is performed over all slots of the number configured for TBoMS, or if TBoMS is configured, a separate CB concatenation operation is not required when the interleaving is performed on all bits output through rate matching.

In a case other than the above case, the CB concatenation may be performed according to the method below.

In an embodiment, all bits corresponding to all rate-matched and interleaved CBs are combined, and a signal processing procedure after the CB concatenation may be performed based on the combination of all bits of all the CBs.

In an embodiment, a slot-based CB concatenation may be performed. For example, when two CBs are mapped to each slot, two CBs mapped to the same slot may be combined. If CBs are different for each slot (PUSCH) and the number of CBs mapped per PUSCH is multiple, CB concatenation may be performed between selected bits of CBs corresponding to each PUSCH.

In an embodiment, when selected bits mapped per PUSCH are obtained for each slot (PUSCH), CB concatenation may be performed between selected bits corresponding to each PUSCH.

Multiplexing

A multiplexing method of a data channel and a control channel for TBoMS according to an embodiment of the disclosure is disclosed. In a slot configured for TBoMS-based PUSCH transmission, when transmitting uplink control information (UCI) including HARQ-ACK or CSI, the UCI may be multiplexed together with a PUSCH for data transmission and transmitted. As another example, when sidelink control information (SCI) is transmitted in a slot configured for TBoMS-based PSSCH transmission, the SCI may be multiplexed together with PSSCH for data transmission and transmitted.

As an example, the entirety of UCI information may be multiplexed based on the same number of bits in all slots, or multiplexed based on an individual number of bits for each slot. As another example, a part constituting the entire UCI information may be multiplexed based on the same number of bits in all slots, or based on an individual number of bits for each slot. As another example, all or part of UCI information may be multiplexed and transmitted in part or one rather than all of a plurality of slots. If UCI is multiplexed in one or more partial slots among a plurality of slots, the method according to the previous two examples may be used. The same method may be applied to multiplexing of SCI and PSSCH. Specifically, data and control information may be multiplexed and transmitted according to the following method.

According to the disclosure, UCI may be multiplexed with PUSCH and transmitted in a slot configured for TBoMS-based PUSCH transmission based on at least one of the following methods.

In one embodiment, entire channel-coded modulation symbols of UCI may be multiplexed and transmitted in each of the PUSCHs of a plurality of slots. In this case, the same number of coded modulation symbols may be multiplexed and transmitted in the PUSCH of all slots. Accordingly, in this case, the calculation of the number of coded modulation symbols for UCI may be performed only once for a plurality of slots. In this case, the calculation of the number of coded modulation symbols for UCI may utilize information on the number of CBs applied to a specific PUSCH, the number of bits per CB, the number of RBs, and the number of time resources. This is inferred from the information included in the DCI. Here, a method of selecting a specific slot is the same as a method described later. Alternatively, the information may be an average value for each slot.

In an embodiment, the calculation of the number of coded modulation symbols for UCI is the same as above in that the calculation of the number of coded modulation symbols is performed only once for a plurality of slots, but the information on the number of CBs, the number of bits per CB, the number of RBs, and the number of time resources is information considering the entire PUSCH, and the calculated coded modulation symbols may be equally divided and multiplexed in each slot or differentially divided and multiplexed based on the number of REs for each slot.

In an embodiment, according to the number of REs (or OFDM symbols) allocated to the PUSCH of each slot, the number of coded modulation symbols individually determined for each PUSCH of each slot may be multiplexed and transmitted. In this case, the calculation of the number of coded modulation symbols for UCI may be individually performed for each slot, and the number of coded modulation symbols multiplexed in each slot may be the same or different. In this case, the calculation of the number of coded modulation symbols for UCI may utilize information on the number of CBs applied to each PUSCH, the number of bits per CB, the number of RBs, and the number of time resources.

In an embodiment, all of the channel-coded modulation symbols of the UCI may be multiplexed and transmitted in some (or one) of a plurality of slots. For example, UCI may be multiplexed and transmitted only in the PUSCH of the first slot, and only UL-SCH may be transmitted in the remaining slots. Alternatively, the PUSCH having the largest number of REs may be selected. The PUSCH or its selection condition may be configured by signaling (RRC, system information, MAC, DCI, . . . ) between the base station and the UE.

According to the present disclosure, when SCI is multiplexed with PSSCH, the same method as when UCI is multiplexed with PUSCH may be applied.

On the other hand, as described above, if control information (UCI, SCI, . . . ) multiplexed in TBoMS-based data channel transmission exists, bit selection in the rate matching step may be performed considering the number of bits inserted for the multiplexing. If modulation symbols corresponding to different numbers of bits are multiplexed for each slot, accordingly, the number of bits determined through the bit selection may also vary for each slot.

The method for performing multiplexing described in the disclosure may be predefined/configured or configured through signaling (RRC, system information, MAC, DCI, . . . ) between the base station and the UE.

Scrambling

A scrambling method for TBoMS according to an embodiment of the disclosure is disclosed. Here, it is assumed that the processing of the placeholder bit in the existing standard is the same as in the prior art.

In an embodiment, only one scrambling code (or scrambling sequence) for the scrambling operation may be generated to be applied over all of a plurality of slots, and the scrambling operation may be performed over all slots. In this case, the scrambling operation may be performed by sequentially mapping bits for data channels (PDSCH/PUSCH/PSSCH) of a plurality of slots from the start of the scrambling code. Alternatively, considering the REs not used for the data channel within the slot, as many bits as corresponding to the bits for the corresponding REs among the scrambling code bits are not used, and a scrambling operation may be performed by mapping from the next bit to the bits for the data channel of the next slot.

In an embodiment, a scrambling code (or scrambling sequence) for a scrambling operation may be generated for each of a plurality of slots, and the scrambling operation may be performed for each slot.

Specifically, data and control information may be multiplexed and transmitted according to the following method.

1. One scrambling code (or scrambling sequence) is generated for all of the plurality of slots, and scrambling may be performed based on this.

1-1. A starting point of the scrambling code for each slot of the entire scrambling sequence may be determined based on the number of coded modulation symbols (i.e., the number of REs for actual PDSCH/PUSCH/PSSCH) in the previous slot. The starting point of the scrambling code for the first slot may be 0.

1-2. A start point of the scrambling code for each slot in the entire scrambling sequence may be determined based on the number of REs between the start RE of the PDSCH/PUSCH/PSSCH of the previous slot and the start RE of the PDSCH/PUSCH/PSSCH of the current slot. In this case, OFDM symbols not allocated to PDSCH/PUSCH/PSSCH and REs for DMRS may also be included. The starting point of the scrambling code for the first slot may be 0.

1-3. A starting point of the scrambling code for each slot of the entire scrambling sequence may be determined based on the slot length and the number of allocated PRB s. The starting point of the scrambling code for the first slot may be 0.

2. A scrambling code is generated for each slot, and scrambling may be performed based on this.

Figure 10A:
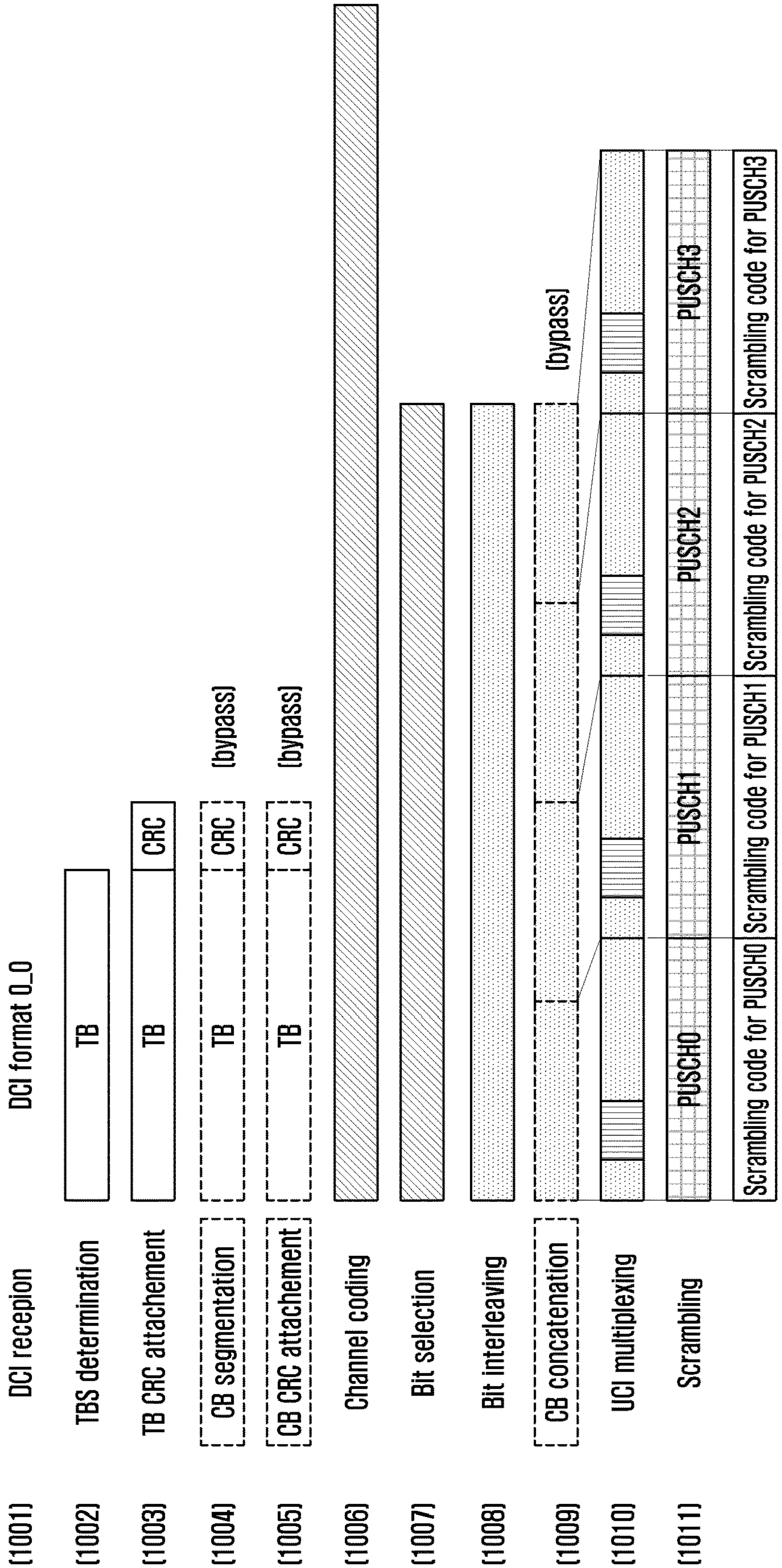
FIG. 10A is a diagram illustrating an example of a signal processing procedure in a physical layer based on a combination of embodiments of the disclosure.
Figure 10B:
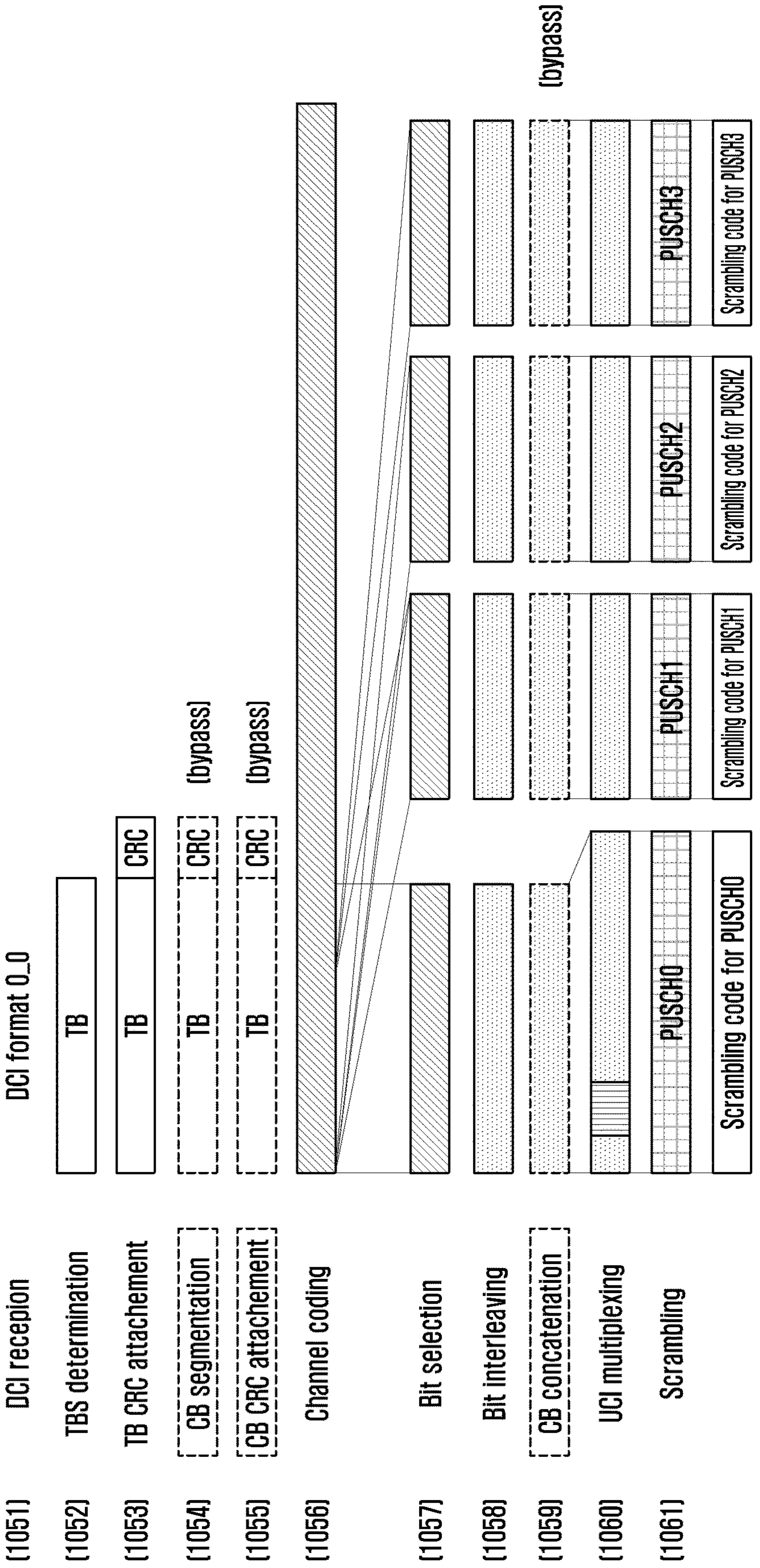
FIG. 10B is a diagram illustrating another example of a signal processing procedure in a physical layer based on a combination of embodiments of the disclosure.

FIGS. 10A and 10B are diagrams illustrating examples of entire signal processing procedures in a physical layer based on a combination of techniques of the disclosure, respectively.

FIGS. 10A and 10B will be described assuming one of the various embodiments described in each physical layer signal processing procedure as an example, but this is only for illustrative purposes and does not limit the scope of the disclosure, and may be modified and applied based on a combination of the various embodiments described above. In addition, specific numerical values used in the description of FIGS. 10A and 10B are also for illustrative purposes only and do not limit the scope of the disclosure. In the following description with reference to FIGS. 10A and 10B, it is assumed that TBoMS is configured through TBoMS configuration information.

Referring to FIG. 10A, a UE may receive DCI format 0_0 for scheduling a PUSCH from a base station (1001). The DCI may include information indicating frequency domain resource allocation (FDRA), time domain resource allocation (TDRA), MCS, and RV. In this example, it is assumed that FDRA, TDRA, MCS, and RV included in one DCI format 0_0 indicate one value through a single field, but this does not limit the scope of the disclosure, and a plurality of fields for indicating information related to PUSCH transmission in a plurality of slots may be included or a plurality of DCIs may be transmitted. Alternatively, some fields (TDRA: the number of PUSCHs may be designated) may be modified and newly interpreted.

TBS may be determined based on TBoMS configuration information and information included in the DCI (1002). For example, if the number of PUSCH transmission slots configured through TBoMS configuration information is 4, the same RE is allocated to PUSCHs in all slots, and the TBS determined based on the number of REs allocated to PUSCHs in one slot is 40 bit, the TBS may be determined as 40*4=160 bits for PUSCH of a total of 4 slots.

A CRC may be attached to the TB corresponding to the determined TBS (1003). The CRC attached to the TB may have, for example, 24 bit size.

On the other hand, as described above, when considering high coding gain in TBoMS, it is preferable to transmit a small TB, and accordingly, in this example, it may be assumed that CB segmentation is not performed (1004). When the CB segmentation is not performed, a separate CB CRC attaching step may also not be performed (1005). However, it should be noted that the omission of 1004 and 1005 is only for this example, and the corresponding operation may be performed according to the above-described embodiments.

Channel coding may be performed on the entire 184 bits to which the CRC is attached to the TB (1006). For example, the channel coding may be performed based on LDPC code.

Rate matching (or bit selection) may be performed on the channel-coded bits (1007). In this example, one rate matching operation is performed over the PUSCH of all slots, and in this case, bit selection may be performed based on channel coded bits according to the RV value indicated through DCI format 0_0. As another example, if the rate matching operation is performed for each slot or CB, RV may be equally applied as a value indicated by DCI for each slot, or may be sequentially determined through a modulo equation. In addition, in this step, the UE may perform bit selection considering UCI bits multiplexed in the PUSCH of a plurality of slots. In this case, if the rate matching operation is performed for each slot or CB in another example, bit selection of different sizes may be performed considering UCI bits multiplexed in each slot.

Interleaving may be performed on the rate-matched bits (1008). In this example, it is assumed that interleaving is performed once for all rate-matched bits, that is, over the PUSCH of all slots. As another example, interleaving may be performed in units of slots or CBs, and a detailed method refers to the above-described embodiment.

In this example, because it is assumed that CB segmentation is not performed previously, CB concatenation may also not be performed (1009). In contrast, if the CB segmentation is performed, the CB concatenation may also be performed, and for a detailed method, refer to the above-described embodiment.

Thereafter, bits for control information (UCI in case of PUSCH transmission) may be multiplexed in PUSCH transmission (1010). In this example, all UCI bits are multiplexed in each PUSCH in all slots, but UCI bits may be multiplexed in PUSCHs in a plurality of slots in various ways according to the above-described embodiment.

After the UCI bit is inserted for multiplexing, scrambling may be performed based on a scrambling code (or scrambling sequence) (1011). In this example, although the scrambling is performed by applying one scrambling code to the PUSCH of all slots as an example, a separate scrambling code may be applied to each slot. When one scrambling code is applied to the PUSCH of all slots, bits corresponding to the PUSCH of each slot may be sequentially mapped to the determined scrambling code. On the other hand, although not separately illustrated, according to an example, scrambling codes corresponding to multiplexed control information (e.g., UCI) bits may be generated based on placeholder bits so that scrambling operations are not performed.

After scrambling, the PUSCH may be transmitted in a plurality of slots through modulation, layer mapping and precoding, resource mapping, and the like.

Referring to FIG. 10B, a UE may receive DCI format 0_0 for scheduling a PUSCH from a base station (1051). The DCI may include information indicating frequency domain resource allocation (FDRA), time domain resource allocation (TDRA), MCS, and RV. In this example, it is assumed that FDRA, TDRA, MCS, and RV included in one DCI format 0_0 indicate one value through a single field, but this does not limit the scope of the disclosure, and a plurality of fields for indicating information related to PUSCH transmission in a plurality of slots may be included or a plurality of DCIs may be transmitted. Alternatively, some fields (TDRA: the number of PUSCHs may be designated) may be modified and newly interpreted.

TBS may be determined based on TBoMS configuration information and information included in the DCI (1052). For example, if the number of PUSCH transmission slots configured through TBoMS configuration information is 4, the same RE is allocated to PUSCHs in all slots, and the TBS determined based on the number of REs allocated to PUSCHs in one slot is 40 bit, the TBS may be determined as 40*4=160 bits for PUSCH of a total of 4 slots.

A CRC may be attached to the TB corresponding to the determined TBS (1053). The CRC attached to the TB may have, for example, 24 bit size.

On the other hand, as described above, when considering high coding gain in TBoMS, it is preferable to transmit a small TB, and accordingly, in this example, it may be assumed that CB segmentation is not performed (1054). When the CB segmentation is not performed, a separate CB CRC attaching step may also not be performed (1055). However, it should be noted that the omission of 1054 and 1055 is only for this example, and the corresponding operation may be performed according to the above-described embodiments.

Channel coding may be performed on the entire 184 bits to which the CRC is attached to the TB (1056). For example, the channel coding may be performed based on LDPC code.

Rate matching (or bit selection) may be performed on the channel-coded bits (1057). In this example, it is exemplified that the rate matching is performed for each PUSCH of each slot, and in this case, it is configured that the RV value indicated through DCI format 0_0 is equally applied to all PUSCH rate matching. In an example, RV may be determined sequentially through a modulo equation. When the rate matching is performed for each PUSCH of a slot, the result of bit selection for each slot may vary according to the number of REs or RV value of each PUSCH. In addition, in this step, the UE may perform bit selection by considering UCI bits multiplexed in the PUSCH of each slot. When the rate matching is performed for each slot or CB, bit selection of different sizes may be performed considering the UCI bits multiplexed in each slot.

Interleaving may be performed on the rate-matched bits (1058). In this example, interleaving is performed in units of slots or CBs. A detailed method refers to the above-described embodiment.

In this example, because it is assumed that CB segmentation is not performed previously, CB concatenation may also not be performed (1059). In contrast, if the CB segmentation is performed, the CB concatenation may also be performed, and for a detailed method, refer to the above-described embodiment.

Thereafter, bits for control information (UCI in case of PUSCH transmission) may be multiplexed in PUSCH transmission (1060). In this example, all UCI bits are multiplexed in one selected PUSCH, but UCI bits may be multiplexed in PUSCHs in a plurality of slots in various ways according to the above-described embodiment.

After the UCI bit is inserted for multiplexing, scrambling may be performed based on a scrambling code (or scrambling sequence) (1061). In this example, a separate scrambling code may be applied for each slot. In this case, if PN code initialization is performed by using the same identifier and parameters (slot index, subframe index, etc.) for time units are not used for PN code generation when generating scrambling codes for each PUSCH, the scrambling codes applied to each slot are substantially the same. However, the length of the scrambling code may be different according to the number of bits allocated to each PUSCH.

After scrambling, the PUSCH may be transmitted in a plurality of slots through modulation, layer mapping and precoding, resource mapping, and the like.

Figure 11:
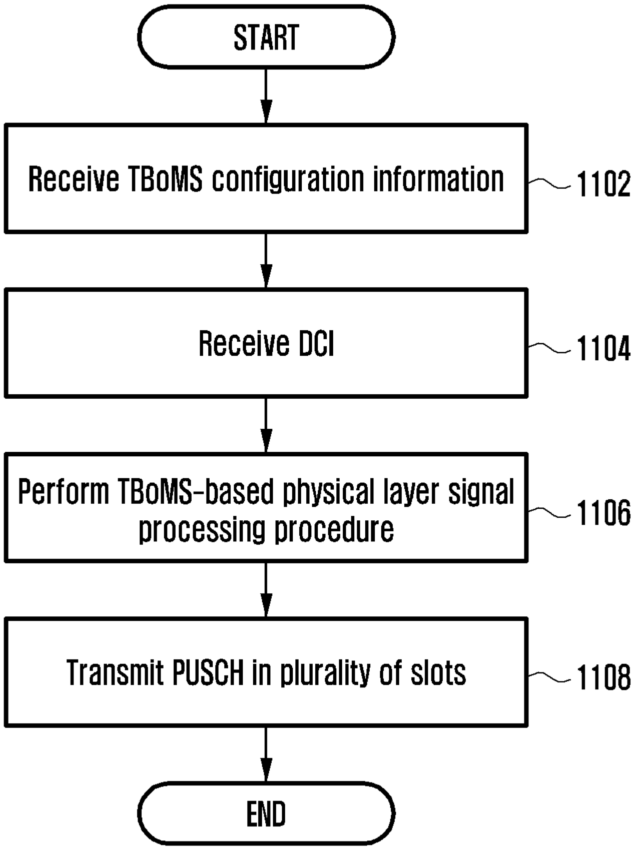
FIG. 11 is a diagram illustrating a UE operation for TBoMS PUSCH transmission according to an embodiment of the disclosure.

FIG. 11 is a diagram illustrating a UE operation for TBoMS PUSCH transmission according to an embodiment of the disclosure.

Referring to FIG. 11, the UE may receive TBoMS configuration information for TBoMS configuration from a base station (1102). The TBoMS configuration information may be configured through arbitrary signaling including RRC signaling, system information, MAC or DCI, and may include arbitrary information used to perform TBoMS physical layer signal processing. For example, the TBoMS configuration information may include information on the number of slots to which one TB is mapped in TBoMS. Thereafter, the UE may receive DCI for scheduling the PUSCH of a plurality of slots from the base station (1104). The corresponding DCI reception operation may refer to the embodiment described above through [DCI format]. The UE may perform a physical layer signal processing procedure according to embodiments of the disclosure to transmit a PUSCH in a plurality of slots based on the TBoMS configuration information and the received DCI (1106). Thereafter, the UE may transmit the PUSCH of a plurality of slots to the base station (1108). Although FIG. 11 has described the TBoMS PUSCH transmission of the UE as an example, this may be equally applied to reception of the PDSCH or transmission and reception of the PSSCH.

Figure 12:
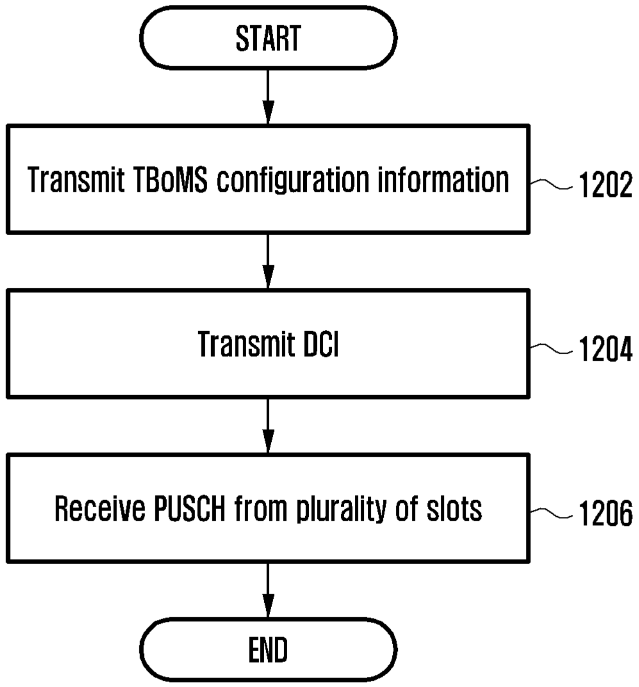
FIG. 12 is a diagram illustrating a base station operation for TBoMS PUSCH reception according to an embodiment of the disclosure.

FIG. 12 is a diagram illustrating a base station operation for TBoMS PUSCH reception according to an embodiment of the disclosure.

Referring to FIG. 12, the base station may transmit TBoMS configuration information for TBoMS configuration to a UE (1202). The TBoMS configuration information may be configured through arbitrary signaling including RRC signaling, system information, MAC or DCI, and may include arbitrary information used to perform TBoMS physical layer signal processing. For example, the TBoMS configuration information may include information on the number of slots to which one TB is mapped in TBoMS. Thereafter, the base station may transmit DCI for scheduling the PUSCH of a plurality of slots to the UE (1204). The UE may perform a physical layer signal processing procedure according to embodiments of the disclosure to transmit a PUSCH in a plurality of slots based on the TBoMS configuration information and the received DCI, and the base station may receive the PUSCH of a plurality of slots from the UE (1206). Although FIG. 12 has described the TBoMS PUSCH reception of the base station as an example, this may be equally applied to transmission of the PDSCH.

Figure 13:
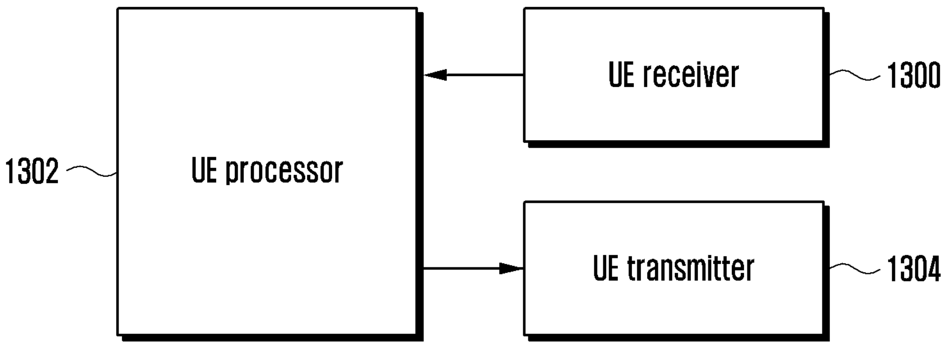
FIG. 13 is a diagram illustrating the structure of a UE according to an embodiment of the disclosure.

FIG. 13 is a diagram illustrating the structure of a UE according to an embodiment of the disclosure.

Referring to FIG. 13, the UE of the disclosure may include a UE receiver 1300, a UE transmitter unit 1304, and a UE processor 1302. The UE receiver 1300 and the UE transmitter 1304 may be collectively referred to as a transceiver in an embodiment of the disclosure. The transceiver may transmit/receive signals with the base station. The signal may include control information and data. To this end, the transceiver may include an RF transmitter for up-converting and amplifying the frequency of a transmitted signal, and an RF receiver for low-noise amplifying a received signal and down-converting the frequency of the signal. In addition, the transceiver may receive a signal through a wireless channel, output the signal to the UE processor 1302, and transmit the signal output from the UE processor 1302 through the wireless channel. The UE processor 1302 may control a series of processes so that the UE may operate according to the above-described embodiment of the disclosure.

Figure 14:
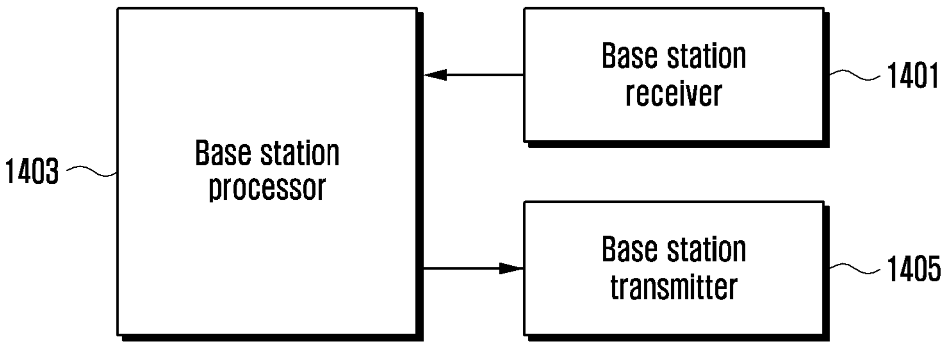
FIG. 14 is a diagram illustrating the structure of a base station according to an embodiment of the disclosure.

FIG. 14 is a diagram illustrating the structure of a base station according to an embodiment of the disclosure.

Referring to FIG. 14, the base station of the disclosure may include a base station receiver 1401, a base station transmitter unit 1405, and a base station processor 1403. The base station receiver 1401 and the base station transmitter unit 1405 may be collectively referred to as a transceiver in an embodiment of the disclosure. The transceiver may transmit/receive signals with the UE. The signal may include control information and data. To this end, the transceiver may include an RF transmitter for up-converting and amplifying the frequency of a transmitted signal, and an RF receiver for low-noise amplifying a received signal and down-converting the frequency of the signal. In addition, the transceiver may receive a signal through a wireless channel, output the signal to the base station processor 1403, and transmit the signal output from the base station processor 1403 through the wireless channel. The base station processor 1403 may control a series of processes so that the base station may operate according to the above-described embodiment of the disclosure.

The embodiments of the disclosure described and shown in the specification and the drawings are merely specific examples that have been presented to easily explain the technical contents of the disclosure and help understanding of the disclosure, and are not intended to limit the scope of the disclosure. That is, it will be apparent to those skilled in the art that other variants based on the technical idea of the disclosure may be implemented. Furthermore, the above respective embodiments may be employed in combination, as necessary. For example, parts of embodiments of the disclosure may be combined with each other to operate a base station and a terminal.

The invention claimed is:

1. A method of a user equipment (UE) in a communication system, the method comprising:

receiving, from a base station via a radio resource control (RRC) signalling, configuration information for a transport block processing over multiple-slots (TBoMS), wherein the configuration information comprises information on a number of slots;

receiving, from the base station, downlink control information (DCI) for scheduling a physical uplink shared channel (PUSCH), wherein:

a time domain resource allocation (TDRA) field, a frequency domain resource allocation (FDRA) field and a redundancy version (RV) field are included in the DCI, the information on the number of slots and information for symbol allocation is indicated based on the TDRA field, the information for the symbol allocation is applied to each slot within the number of slots, and information for the RV is applied to a first slot within the number of slots;

determining a transport block size (TBS) for the PUSCH based on the configuration information, wherein the TBS for the PUSCH is based on a total number of resource elements (REs) allocated for the PUSCH, and the total number of REs allocated for the PUSCH is based on the number of slots;

performing channel coding;

performing rate matching based on the information for the RV indicated by the DCI; and transmitting, to the base station, the PUSCH in the slots.

2. The method of claim 1, wherein, for a bit selection of the rate matching:

an index of starting coded bit for first slot within the number of slots is determined based on the information for the RV; and an index of starting coded bit for a slot except for the first slot within the number of slots is determined based on a total number of coded bits for transmission of the transport block in a previous slot within the number of slots.

3. The method of claim 1, wherein transmit power for the PUSCH is determined based on the number of slots.

4. The method of claim 1, wherein information associated with the TBS for the PUSCH is determined to be no larger than a predetermined value according to the configuration information, and a number of code block (CB) for the TBS is 1.

5. The method of claim 1, wherein the TDRA field indicates one configuration information for the TBoMS among a list of the configuration information for the TBoMS.

6. A method of a base station in a communication system, the method comprising:

transmitting, to a user equipment (UE) via a radio resource control (RRC) signalling, configuration information for a transport block processing over multiple-slots (TBoMS), wherein the configuration information comprises information on a number of slots;

transmitting, to the UE, downlink control information (DCI) for scheduling a physical uplink shared channel (PUSCH), wherein:

a time domain resource allocation (TDRA) field, a frequency domain resource allocation (FDRA) field and a redundancy version (RV) field are included in the DCI, the information on the number of slots and information for symbol allocation is indicated based on the TDRA field, the information for the symbol allocation is applied to each slot within the number of slots, and information for the RV is applied to a first slot within the number of slots;

determining a transport block size (TBS) for the PUSCH according to the configuration information, wherein the TBS for the PUSCH is based on a total number of resource elements (REs) allocated for the PUSCH, and the total number of REs allocated for the PUSCH is based on the number of slots;

receiving, from the UE, the PUSCH in the slots;

performing rate dematching according to the information for the RV indicated by the DCI; and performing channel decoding.

7. The method of claim 6, wherein, for a bit selection of the rate matching:

an index of starting coded bit for first slot within the number of slots is determined based on the information for the RV; and an index of starting coded bit for a slot except for the first slot within the number of slots is determined based on a total number of coded bits for transmission of the transport block in a previous slot within the number of slots.

8. The method of claim 6, wherein transmit power for the PUSCH is based on the number of slots.

9. The method of claim 6, wherein information associated with the TBS for the PUSCH is determined to be no larger than a predetermined value according to the configuration information, and a number of code block (CB) for the TBS is 1.

10. The method of claim 6, wherein the TDRA field indicates one configuration information for the TBoMS among a list of the configuration information for the TBoMS.

11. A user equipment (UE) in a communication system, comprising:

at least one transceiver; and at least one processor communicatively coupled to the at least one transceiver; and at least one memory, communicatively coupled to the at least one processor, storing instructions executable by the at least one processor individually or in any combination to cause the UE to:

receive, from a base station via a radio resource control (RRC) signalling, configuration information for a transport block processing over multiple-slots (TBoMS), wherein the configuration information comprises information on a number of slots;

receive, from the base station, downlink control information (DCI) for scheduling a physical uplink shared channel (PUSCH), wherein:

a time domain resource allocation (TDRA) field, a frequency domain resource allocation (FDRA) field and a redundancy version (RV) field are included in the DCI, the information on the number of slots and information for symbol allocation is indicated based on the TDRA field, the information for the symbol allocation is applied to each slot within the number of slots, and information for the RV is applied to a first slot within the number of slots;

determine a transport block size (TBS) for the PUSCH based on the configuration information, wherein the TBS for the PUSCH is based on a total number of resource elements (REs) allocated for the PUSCH, and the total number of REs allocated for the PUSCH is based on the number of slots;

perform channel coding;

perform rate matching based on the information for the RV indicated by the DCI; and transmit, to the base station, the PUSCH in the slots.

12. The UE of claim 11, wherein, for a bit selection of the rate matching:

an index of starting coded bit for first slot within the number of slots is determined based on the information for the RV; and an index of starting coded bit for a slot except for the first slot within the number of slots is determined based on a total number of coded bits for transmission of the transport block in a previous slot within the number of slots.

13. The UE of claim 11, wherein transmit power for the PUSCH is determined based on the number of slots.

14. The UE of claim 11, wherein information associated with the TBS for the PUSCH is determined to be no larger than a predetermined value according to the configuration information, and a number of code block (CB) for the TBS is 1.

15. The UE of claim 11, wherein the TDRA field indicates one configuration information for the TBoMS among a list of the configuration information for the TBoMS.

16. A base station in a communication system, comprising:

at least one transceiver; and at least one processor communicatively coupled to the at least one transceiver; and at least one memory, communicatively coupled to the at least one processor, storing instructions executable by the at least one processor individually or in any combination to cause the base station to:

transmit, to a user equipment (UE) via a radio resource control (RRC) signalling, configuration information for a transport block processing over multiple-slots (TBoMS), wherein the configuration information comprises information on a number of slots;

transmit, to the UE, downlink control information (DCI) for scheduling a physical uplink shared channel (PUSCH), wherein:

a time domain resource allocation (TDRA) field, a frequency domain resource allocation (FDRA) field and a redundancy version (RV) field are included in the DCI, the information on the number of slots and information for symbol allocation is indicated based on the TDRA field, the information for the symbol allocation is applied to each slot within the number of slots, and information for the RV is applied to a first slot within the number of slots;

determine a transport block size (TBS) for the PUSCH according to the configuration information, wherein the TBS for the PUSCH is based on a total number of resource elements (REs) allocated for the PUSCH, and the total number of REs allocated for the PUSCH is based on the number of slots;

receive, from the UE, the PUSCH in the slots;

perform rate dematching according to the information for the RV indicated by the DCI; and perform channel decoding.

17. The base station of claim 16, wherein, for a bit selection of the rate matching:

an index of starting coded bit for first slot within the number of slots is determined based on the information for the RV; and an index of starting coded bit for a slot except for the first slot within the number of slots is determined based on a total number of coded bits for transmission of the transport block in a previous slot within the number of slots.

18. The base station of claim 16, wherein transmit power for the PUSCH is based on the number of slots.

19. The base station of claim 16, wherein information associated with the TBS for the PUSCH is determined to be no larger than a predetermined value according to the configuration information, and a number of code block (CB) for the TBS is 1.

20. The base station of claim 16, wherein the TDRA field indicates one configuration information for the TBoMS among a list of the configuration information for the TBoMS.

* * * * *